(12) United States Patent
Suru

(10) Patent No.: US 10,970,730 B2
(45) Date of Patent: Apr. 6, 2021

(54) SYSTEMS AND METHODS FOR NETWORKED REFERRAL MARKETING TRANSACTIONS

(71) Applicant: Pritam Suru, Surat (IN)

(72) Inventor: Pritam Suru, Surat (IN)

( * ) Notice: Subject to any disclaimer, the term of this patent is extended or adjusted under 35 U.S.C. 154(b) by 0 days.

(21) Appl. No.: 16/673,284

(22) Filed: Nov. 4, 2019

(65) Prior Publication Data

US 2020/0302464 A1   Sep. 24, 2020

Related U.S. Application Data

(60) Provisional application No. 62/822,431, filed on Mar. 22, 2019.

(30) Foreign Application Priority Data

Oct. 15, 2019   (IN) .............................. 201921041743

(51) Int. Cl.
G06Q 30/02   (2012.01)
(52) U.S. Cl.
CPC ..... G06Q 30/0214 (2013.01); G06Q 30/0215 (2013.01)
(58) Field of Classification Search
CPC ....................... G06Q 30/0214; G06Q 30/0215
See application file for complete search history.

(56) References Cited

U.S. PATENT DOCUMENTS

| 7,774,229 | B1 * | 8/2010 | Dernehl | G06Q 30/0253 |
| | | | | 705/14.16 |
| 8,825,523 | B2 * | 9/2014 | Gillenson | G06Q 30/02 |
| | | | | 705/14.17 |
| 9,466,075 | B2 * | 10/2016 | Carlson | G06Q 30/0277 |
| 10,229,427 | B2 * | 3/2019 | Glazier | G06Q 30/0214 |

(Continued)

OTHER PUBLICATIONS

"Empower Network—The Official Empower Network Affiliate Compensation Model" (Wood, David; published on Dec. 20, 2011 and available at https://www.truthinadvertising.org/wp-content/uploads/2017/10/EN_Compensation_Model.pdf) (Year: 2011).*

*Primary Examiner* — James M Detweiler
(74) *Attorney, Agent, or Firm* — Cogent Law Group LLP; Evan R. Smith

(57) ABSTRACT

An electronic distributed computing system connecting both merchant and customer devices implements a referral marketing program that rewards customers for recruiting other customers to purchase products from the merchant and join the referral marketing program. A customer uses an application to purchase a product or service and is invited to join the referral marketing program. The customer is optionally invited to select an incentive level and a target number of recruits. After paying a referral program fee that varies based on the cost of the customer's purchase, the incentive level, and the recruiting target, the customer obtains the targeted number of electronic referral keys. The customer provides these referral keys to recruited customers in exchange for a predetermined resale program fee. The recruited customer can redeem the referral key to join the referral marketing program and obtain their own referral keys, after making a purchase from the merchant.

20 Claims, 30 Drawing Sheets

(56) References Cited

U.S. PATENT DOCUMENTS

2010/0299252 A1* 11/2010 Thomas ................ G06Q 20/10
　　　　　　　　　　　　　　　　　　　　　705/39
2013/0332255 A1* 12/2013 Carlson .............. G06O 30/0226
　　　　　　　　　　　　　　　　　　　　　705/14.27
2015/0242881 A1* 8/2015 Osborne ............ G06Q 30/0236
　　　　　　　　　　　　　　　　　　　　　705/14.36

* cited by examiner

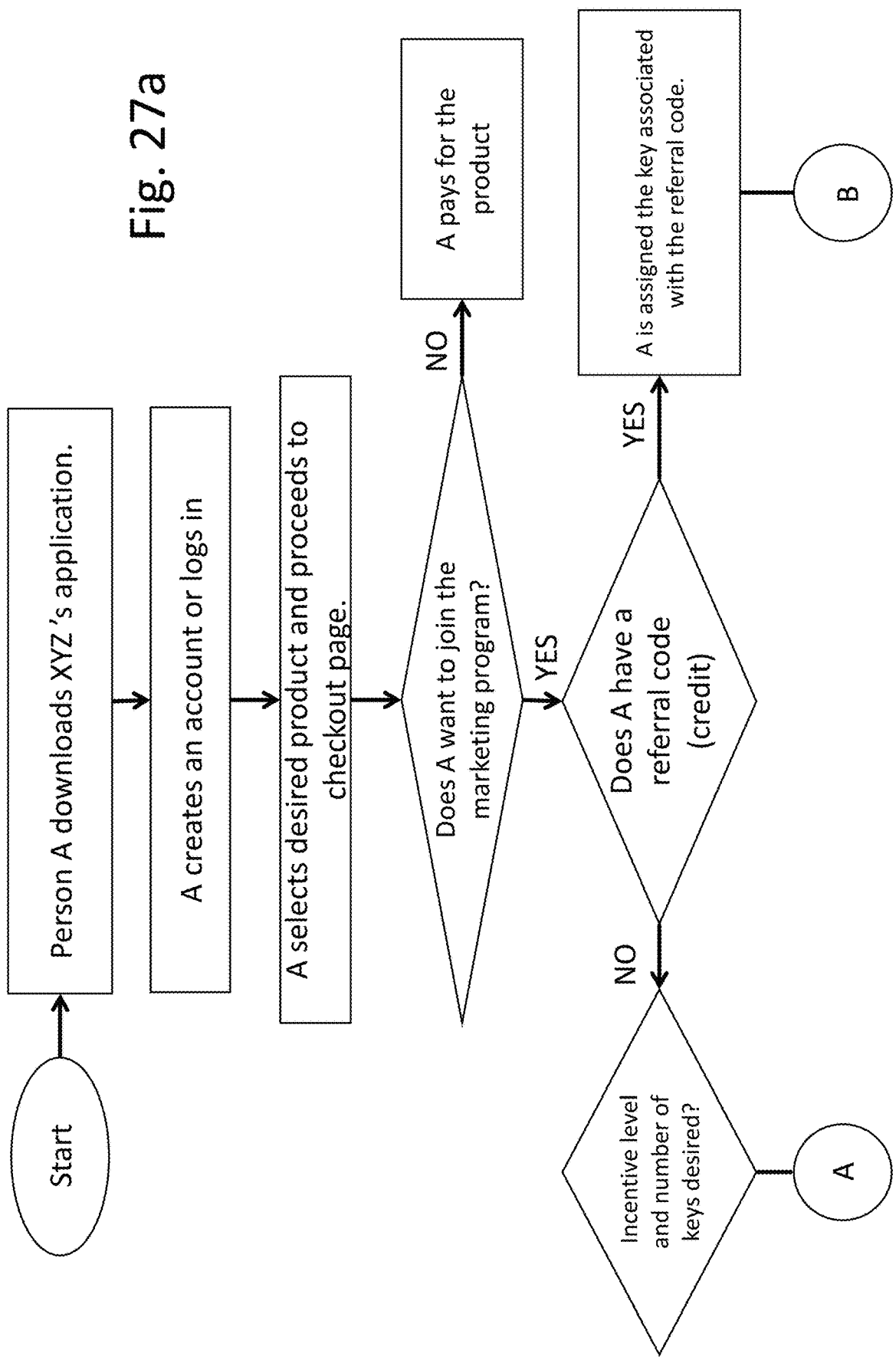

SYSTEMS AND METHODS FOR NETWORKED REFERRAL MARKETING TRANSACTIONS

This application claims the benefit of U.S. Provisional Patent Application Ser. No. 62/822,431, filed Mar. 22, 2019 and entitled "Directly Incentivized Referral Marketing." The entire specification of the foregoing application is incorporated herein by reference.

TECHNICAL FIELD

The present invention relates generally to systems and methods for processing referral marketing sales transactions using networked computing devices, and for enabling referral marketing communications among the computing devices.

BACKGROUND ART

Existing referral marketing systems and methods allow a first person to introduce an application or product of a company to a second person and, in return, receive a benefit from the company when the second person does business with the company.

In a typical prior art example illustrated in FIGS. 1A and 1B, an application such as "Uber Eats" is offered to smart phone users. As shown in FIG. 1A, when the application is downloaded and installed in the smartphone, Person A is assigned a User Identification Number or UID. When Person A convinces a second person, Person B, to download and install the Uber Eats application, the application asks Person B to provide a UID number if he has one, as shown in FIG. 1B. When Person B submits Person A's UID, the servers enabling the application are informed that Person B is a customer referred by Person A. Person A can thereafter be provided with various rewards when Person B makes purchases from, for example, Uber Eats. The application may then transfer a coupon code, cash amount, or other incentive to Person A's account in response to the signup and/or purchases of Person B. One example of a system that tracks referrals and rewards referring customers can be found in WIPO publication WO0111472 (A1).

There are also internet-based electronic commerce systems that implement multi-level marketing (MLM) reward programs. These systems allow participants to recruit new customers and refer them to the sponsoring company to purchase products. The new customers are encouraged to participate as referrers to obtain financial and other rewards. One such system is disclosed in U.S. patent publication US2010094695 (A1).

Established businesses have also sold products and services through a membership model, where the customer first pays a fee to join the organization without receiving any goods or services in exchange for that fee. The membership fee provides the new member with access to the goods and services sold by the company. Organizations such as Costco, B.J.'s and Sam's Club based in the United States implement examples of this marketing method. Some of these organizations have also paid a referral fee or provided a store credit as compensation to members who encourage their contacts to sign up for a similar membership.

The inventor has noted that existing electronic commerce incentive systems and implementations have significant design flaws that limit their ability to effectively motivate, reward, and enable electronic commerce referrals.

Many of the systems employed in multi-level marketing or MLM commerce implement complex rules that are difficult for participants to fully understand. In many MLM systems, participants believe they can obtain significant rewards, but the system is designed around rewards hierarchies that make rewards far more difficult to earn than it first appears. As a result, in most cases the financial benefits of MLM systems are directed almost entirely to a small number of individuals who are early entrants to the system or have amassed a large personal following. The vast majority of customers of these MLM electronic commerce systems lose money rather than receiving any financial rewards. As a result of these and other abuses the traditional MLM industry is viewed by many people with suspicion. In the United States and other jurisdictions, MLM commerce systems are subjected to a variety of state and federal laws placing some limits on their excesses, prohibiting deceptive recruiting methods that were widespread prior to regulation, and requiring disclosure of the fact that most people who participate in those referral programs lose money.

In view of these and other limitations of existing referral marketing systems, the inventor believes there is a need for improved e-commerce systems that operate in global networks and implement simple, easy-to-understand-and-achieve rewards for referring customers to a vendor.

DISCLOSURE OF THE INVENTION

The present disclosure includes a system and method that can be implemented by companies engaged in selling products and services to encourage and benefit from referral marketing sales transactions, all processed using networked computing devices. These systems preferably also support referrals by enabling referral marketing communications among the computing devices.

In example embodiments, a first customer A downloads an application sponsored by or associated with a company selling products or services online (referred to herein as XYZ), and logs in or signs up for an account. This first customer selects a product or service that he/she wishes to purchase from XYZ.

Customer A starts a checkout process and is invited to participate in the referral marketing program described herein. If customer A elects to participate, he/she pays for the selected product and pays an additional fee for obtaining referral keys from the referral program, which will be described herein as a referral program fee or "block creation" fee. As an example, customer A may purchase a $10 product and pay a $20 program fee to establish a referral structure wherein customer A receives referral keys and can recruit additional customers to make purchases and participate in the referral program. The applicable membership fee in each case is calculated according to a predetermined formula and, in a preferred embodiment, depends on three factors: (1) the price of the product purchased, (2) a number (selected by customer A from a predetermined range) of new customers to be referred, and (3) a desired incentive level (such as 2× or 3×) selected by customer A from a predetermined set of choices.

On receiving the payment, XYZ provides customer A with an activated user identification (UID-1) received from a server that maintains records of referring and referred customers, user identifications, and referral keys. Further, additional user identifications (for example, UID-2, UID-3, and UID-4) are created and reserved for assignment to new customers to be recruited or referred by customer A. Thus, in exchange for his initial payment to the company, Customer A has received a purchased product or service, and three referral codes that can be distributed by customer A to new customers B, C, and D.

Customer A then encourages, for example, new customer B to make a purchase for XYZ and join the marketing program. Customer A collects from customer B a fee of no more than a predetermined authorized resale fee. The authorized resale fee is calculated based on the membership fee paid by customer A when joining the marketing program. In this example, the authorized resale fee is $20. Customer A is not required to collect the full authorized amount from customer B; that is, customer A can gift the referral key to B or offer the key at a discounted price if customer A wishes to do so. Customer B, having paid the agreed amount to customer A, receives one of customer A's referral keys. Customer A confirms receipt of payment from customer B in the application to make the key ready for activation.

Next, customer B downloads the XYZ application, selects a product or service to purchase from XYZ and completes the purchase. After customer B completes his/her purchase, he/she is then automatically invited to participate in the referral program. Customer B enters the referring identification number UID-2 given to him by customer A and UID-2 is activated and assigned to customer B.

At the point of joining the referral program, Customer B is provided with a block creation fee credit equal to the authorized membership resale fee associated with the key received from customer A. When enrolling in the referral program, customer B has selected the product he/she wishes to purchase, so that its price is known. Customer B can select from a predetermined range (such as 3 to 9) a number of new customers to be referred by B, and in some embodiments can select a desired incentive level selected from a predetermined set of choices, such as 2× or 3×. An appropriate block creation fee is calculated for customer B based on his/her choices. If the block creation fee exceeds the block creation fee credit received by customer B, customer B pays the additional fee due. If the block creation fee due from customer B is less than customer B's available credit, the block creation fee is deducted from the available account credit and customer B is left with a credit balance usable for the creation of additional referral marketing blocks in the future.

Customer A similarly encourages new customers C and D to obtain a referral key from customer A and to perform the same download, purchase, and referral program registration process. When customers C and D agree to participate they are allocated UID-3 and UID-4 respectively.

Provided that customer A chooses to collect the full authorized resale fee from each of his/her three referrals, customer A will have received a total of $60 in resale fees from Customers B, C, and D. Thus, customer A paid a total of $30 to obtain the product and join the referral program, and upon completing his/her referral recruiting goal, has obtained a 2× return on the original payment or $60. Further, customer A still has the product he/she purchased, an additional $10 value.

Each of B, C, and D receive the number of inactivated keys (UIDs) that they selected in the registration process, and can then distribute those keys to people they want to refer to XYZ and the marketing program. As members of the referral program, B, C, and D have the same opportunity provided to A to make an initial purchase, recruit additional persons who would like to make a purchase from XYZ and participate in the referral marketing program, and obtain a reward incentive for their participation.

BRIEF DESCRIPTION OF THE DRAWINGS

The accompanying drawings, which are incorporated herein and form a part of the specification, illustrate various exemplary embodiments of the present invention and, together with the description, further serve to explain various principles and to enable a person skilled in the pertinent art to make and use the invention.

FIGS. 27*a*-27*d* together constitute a flow chart of a process that enables additional functionality, as implemented in a further example embodiment of the invention.

BEST MODE FOR CARRYING OUT THE INVENTION

The present invention will be described in terms of one or more examples, with reference to the accompanying drawings.

The present invention will also be explained in terms of exemplary embodiments. This specification discloses one or more embodiments that incorporate the features of this invention. The disclosure herein will provide examples of embodiments, including examples from which those skilled in the art will appreciate various novel approaches and features developed by the inventor. These various novel approaches and features, as they may appear herein, may be used individually, or in combination with each other as desired.

The embodiment(s) described, and references in the specification to "one embodiment", "an embodiment", "an example embodiment", etc., indicate that the embodiment(s) described may include a specific feature, structure, or characteristic, but every embodiment may not necessarily include the particular feature, structure, or characteristic. Moreover, such phrases are not necessarily referring to the same embodiment. Further, when a feature, structure, or characteristic is described in relation to an embodiment, persons skilled in the art may implement such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g. a computing device). For example, a machine-readable medium may include read only memory (ROM); random access memory (RAM); hardware memory in notebook and handheld computers, PDAs, smart phones, tablets, wearable processing devices, and other portable devices; magnetic disk storage media; optical storage media; thumb drives and other flash memory devices; electrical, optical, acoustical, or other forms of propagated signals (e.g. carrier waves, infrared signals, digital signals, analog signals, etc.), Internet cloud storage, and others. Further, firmware, software, routines, and instructions may be described herein as performing certain actions. However, it should be appreciated that such descriptions are merely for convenience and that such actions in fact result from computing devices, processors, controllers or other devices executing the firmware, software, routines, instructions, etc.

Figure 1A:
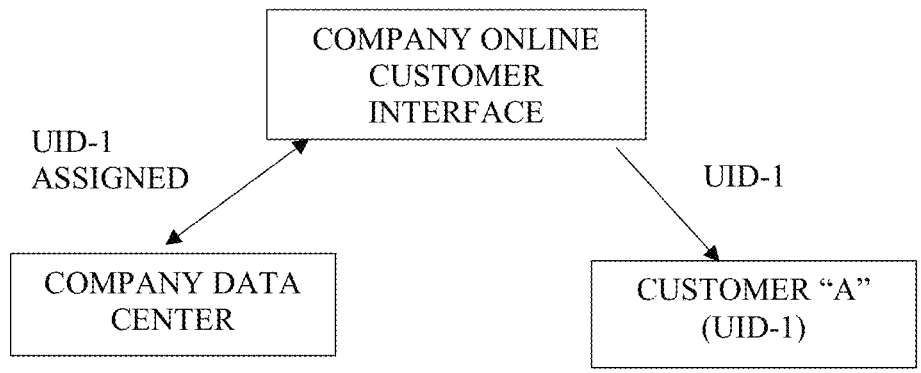
FIGS. 1A and 1B are block schematic diagrams showing first and second steps in the operation of an exemplary prior art referral marketing application.
Figure 1B:
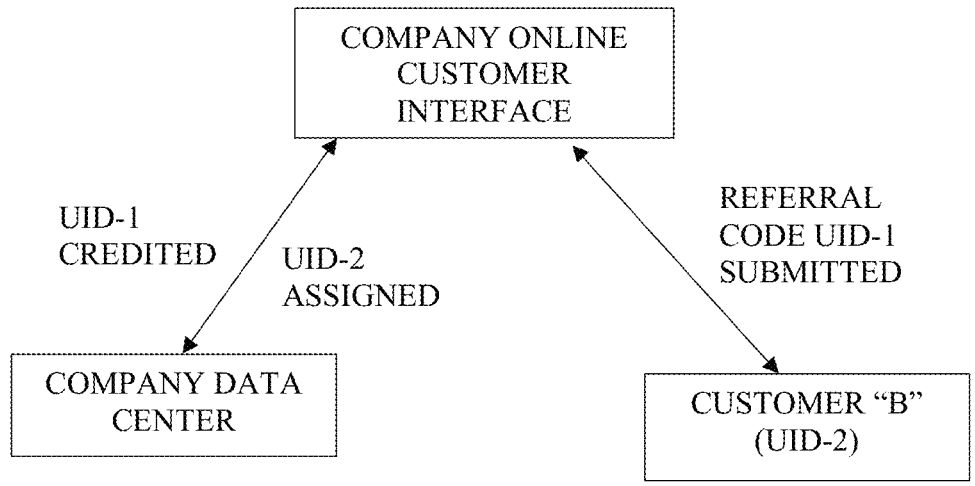
Figure 2:
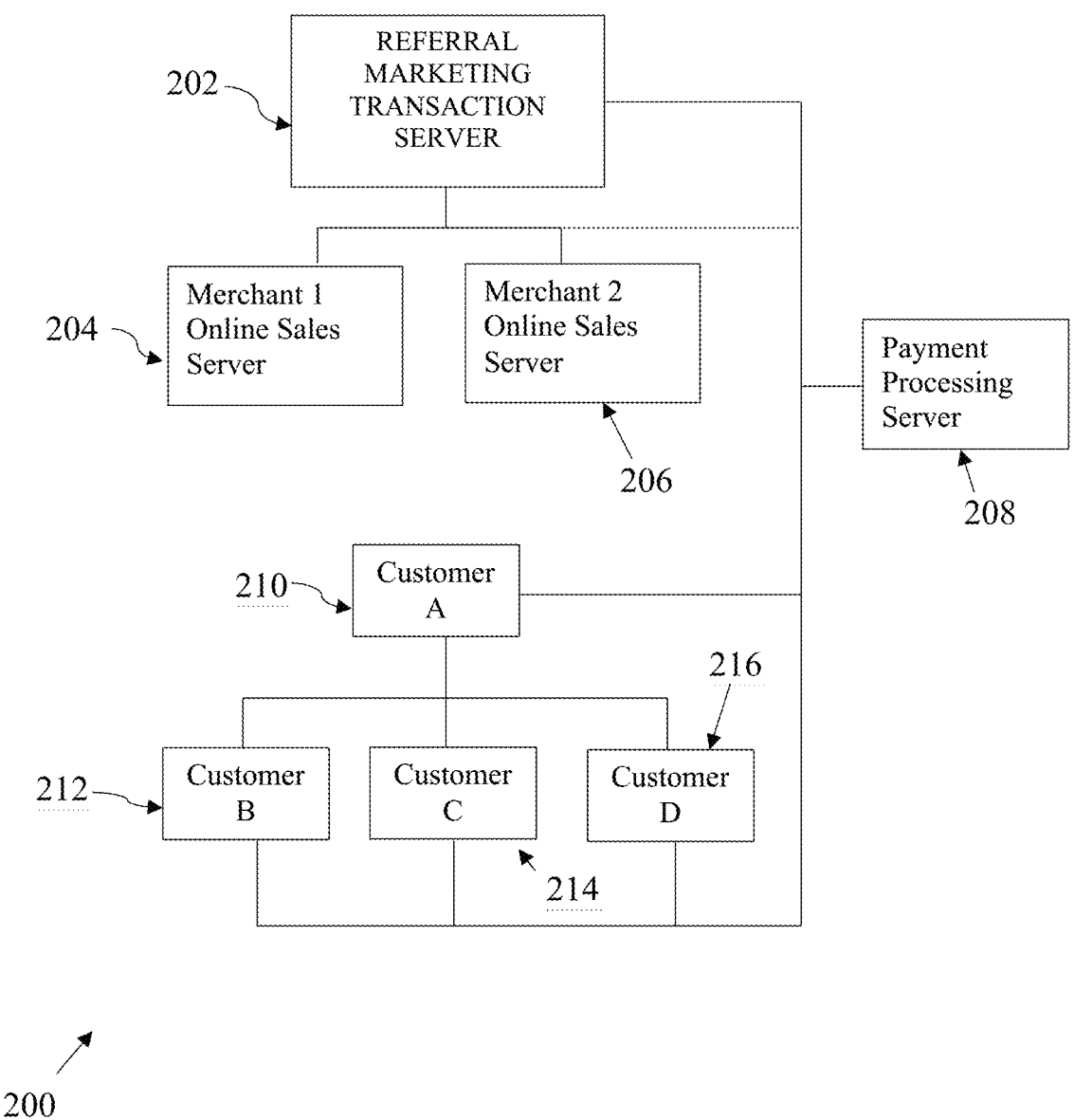
FIG. 2 is a block schematic diagram showing electronic connections between an example embodiment of the present system and customer devices to implement the processes disclosed herein.

FIG. 2 illustrates an example embodiment that uses a networked electronic system 200 to implement a referral marketing process, in a manner that will be described in detail herein. In the exemplary embodiment of FIG. 2, system 200 comprises referral marketing transaction server 202, one or more online sales servers for merchants (shown as 204, 206), and one or more payment processing servers 208. The servers 202, 204, 206, and 208 are operationally connected to exchange data via a communications network such as the internet. Customer devices are also operationally connected to the communications network so that these devices can communicate with one or more of the servers shown in FIG. 2, as needed. Customer devices can include a variety of digital electronic processing devices, for example, desktop computers, smartphones, tablets, laptops, and watches and other wearable digital products. FIG. 2 shows devices 210, 212, 214, and 216 used by customers A, B, C, and D respectively to interact and perform transactions in system 200.

Those skilled in the art will also appreciate that a variety of system architectures can be used to implement system 200. In particular, while servers 202, 204, 206 and 208 are each illustrated in the drawing as a single block, there is no requirement that these servers be implemented as single separate units in either a hardware or functional sense. The functions performed by any of these servers may be operated in one or more combined hardware servers, in one or more virtual or cloud-based servers, and divided among multiple physical or cloud locations for various purposes, such as for increased reliability, cost reduction, network load balancing, geographic distribution, disaster recovery, legal compliance, requirements of contractual agreements, and many other reasons.

Figure 3:
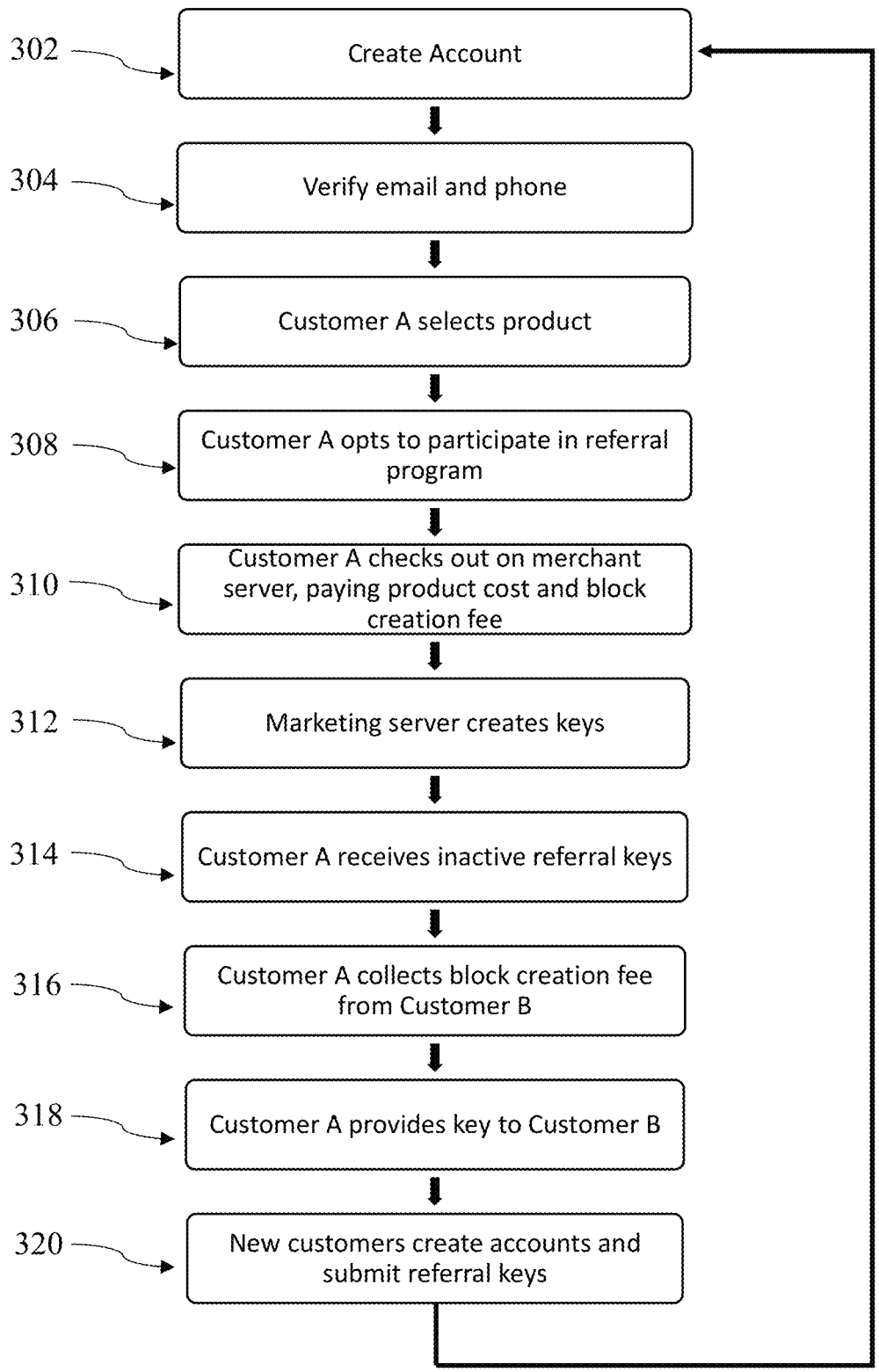
FIG. 3 is a flowchart showing a process used in an example embodiment.

FIG. 3 is a flow chart showing a first example embodiment of a process for operating a novel referral marketing program using an electronic transactional network such as system 200 described in FIG. 2. The example process starts at step 302 wherein a customer (customer "A") installs a downloadable application on customer A's device 210 (shown in FIG. 2), opens the application in device 210, and creates an account. The application is preferably provided for download through one or more application marketplaces such as the Google Store or Apple Store. The application may be, for example, published to selected marketplaces by or on behalf of a company engaged in online sales of products and services. For purposes of this example embodiment, the online sales company and publisher of the application will be referred to as Merchant 1 or XYZ. Merchant 1 (XYZ) in this example is the operator of online sales server 204 (shown in FIG. 2). After customer A creates an account, in step 304, customer A provides verification of their email address and mobile telephone number through the application, email, or using other devices as appropriate.

In step 306, customer A accesses the online product and service catalog of XYZ company, either via the application running in device 210, or through a link to another application available on the device. Customer A then selects a product or service to be purchased and adds the desired product or service to an online cart.

In step 308 customer A is offered the opportunity to participate in the present referral marketing program and opts to participate.

In certain embodiments, as part of step 308, customer A is invited to select a number of people (quantity "K") that he/she believes he/she can recruit as customers of XYZ. Optionally, customer A may also be allowed to select a desired incentive level. As noted previously, XYZ will collect from customer A a referral program (block creation) fee in consideration of customer A becoming a recruiter and receiving referral keys to distribute in the referral marketing program. The incentive level is a multiplier, relating to a multiple of the total amount initially paid by customer A (referral membership fee plus product purchase cost). The incentive level multiple represents the total amount that customer A can expect to receive in exchange for distributing his/her referral keys, assuming that customer A successfully refers K persons (the goal number selected by customer A) to XYZ and collects the full authorized resale fee from each referred person. In the present example, customer A purchases a product costing $10 and if the incentive level is 2 and K=3, customer A's referral membership fee is $20. If customer A collects the authorized membership resale fee from each referred customer, A receives a total of $60, which is twice the amount originally paid. Further, in addition to receiving $60, customer A retains the $10 product he/she purchased.

The default incentive level is preferably 2, but a variety of other options may be offered to customer A, such as an incentive level of 1, 1.5 or 3. At an incentive level of 1, customer A has the opportunity to obtain the purchased product for free and will not profit from the resale of referral keys. Other predetermined integer or fractional numbers can be offered as incentive levels, or a range of integer or fractional numbers between predetermined high and low limits may be offered as desired.

In an alternative embodiment, to simplify the process of enrolling new participants and explaining the program to them, quantity K may be set at a fixed number such as 3, and the incentive level may be set at a fixed value such as 1.5 or 2.

In step 310, customer A completes an online checkout process employing digital communication between customer A's device 210 and server 204 (shown in FIG. 2). In this checkout process, XYZ collects from customer A the price of the selected product or service, and also collects the referral marketing program membership fee or "block creation fee" due according to a predetermined formula. To simplify network transactions and data communications processes, the membership or block creation fee may be collected by XYZ, but this fee may be partially or entirely remitted to BB depending on financial arrangements between XYZ and BB. Upon completion of the checkout process, server 204 notifies referral marketing transaction server 202 that customer A has joined the program.

Next, in step 312, referral marketing transaction server 204 obtains customer ID information for customer A from server 204, as well as relevant information about customer A's registration and selected preferences, and creates a new referral "block" record for customer A. The selected number of referral keys (quantity "K") are created and associated with customer A's referral block.

In step 314, information about the new, inactive keys is made available to the XYZ application running in customer A's device 210 so that key status and availability for distribution can be easily monitored by customer A.

In step 316, customer A collects a block creation fee from customer B and, using functional selections on a key status screen in the XYZ application in customer A's device 210, selects one of the available keys. In the process of this selection, customer A's application and device 210 transmit a notice to referral marketing transaction server 202 that the selected key has been provided to a customer and that this key should be marked as ready for activation when customer B has completed a referral purchase from XYZ.

In step 318, customer A provides the selected key information to customer B. Finally, in step 320, new customer B repeats the process herein starting at step 302, using the referral key received from customer A to obtain credit for his initial referral membership (block creation) fee upon enrolling in the referral marketing program.

Customer A continues to recruit new referrals, until customer A has recruited a total of K persons to XYZ and to the marketing program. When K referrals have been recruited, customer A's block is filled, the distribution of the referral keys assigned to customer A in that block is complete, and customer A has earned the referral incentive determined by his selections at the time of enrolling and creating the block, less any discounts that customer A chose to provide to his/her recruits.

Figure 4:
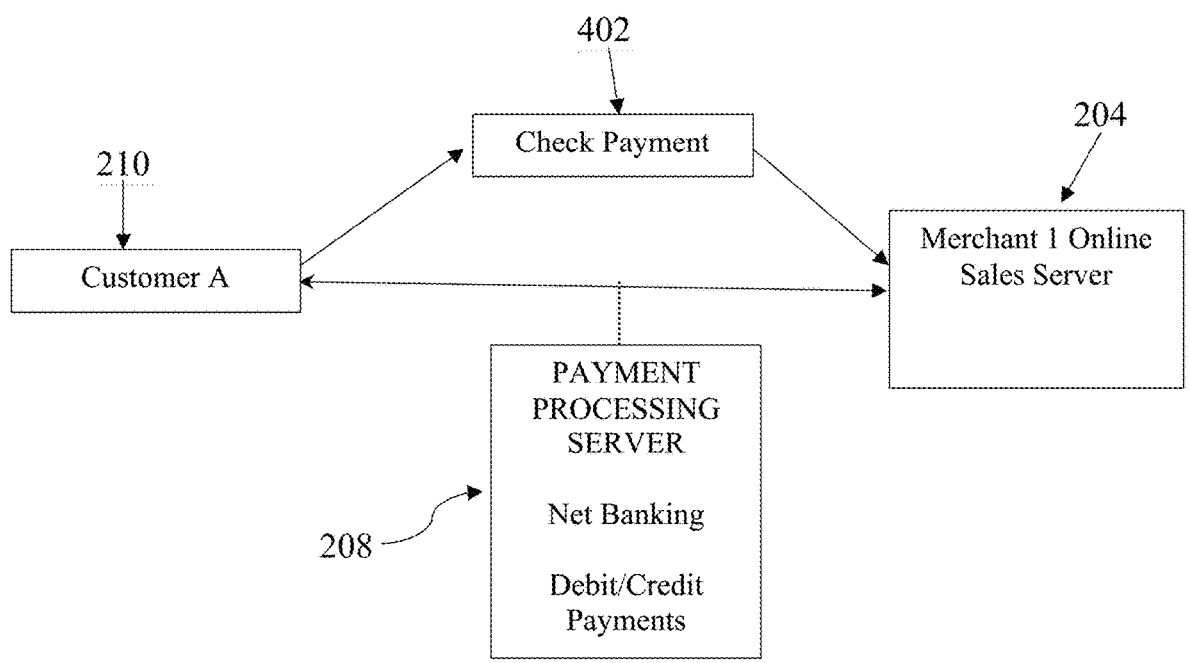
FIG. 4 is a block schematic diagram illustrating transaction payment options available to an initial customer in an example embodiment.

FIG. 4 is a block schematic diagram showing examples of how payments may be transmitted from Customer A to XYZ. Payments can be made electronically through the XYZ application, initiated by Customer A's device 210 and received and processed by the payment processing server 208, the Merchant 1 online sales server 204, or by a combined interaction of device 210 and servers 204 and 208.

The payment processing server 208, although shown in the drawing figure as a single server for purposes of clarity, may comprise more than one server and provide more than one financial transaction service option. Preferably a range of payment options are provided, which may include (for example) debit and credit card transactions, ACH, direct debit, internet banking, cryptocurrency, and electronic transfer payment services such as the Cash application, Venmo, PayPal, Xoom, etc. Although less preferred, check payments 402 can also be accommodated, with credit provided to Customer a upon receipt of funds and entry into customer A's account record in the Merchant 1 online sales server 204.

Figure 5:
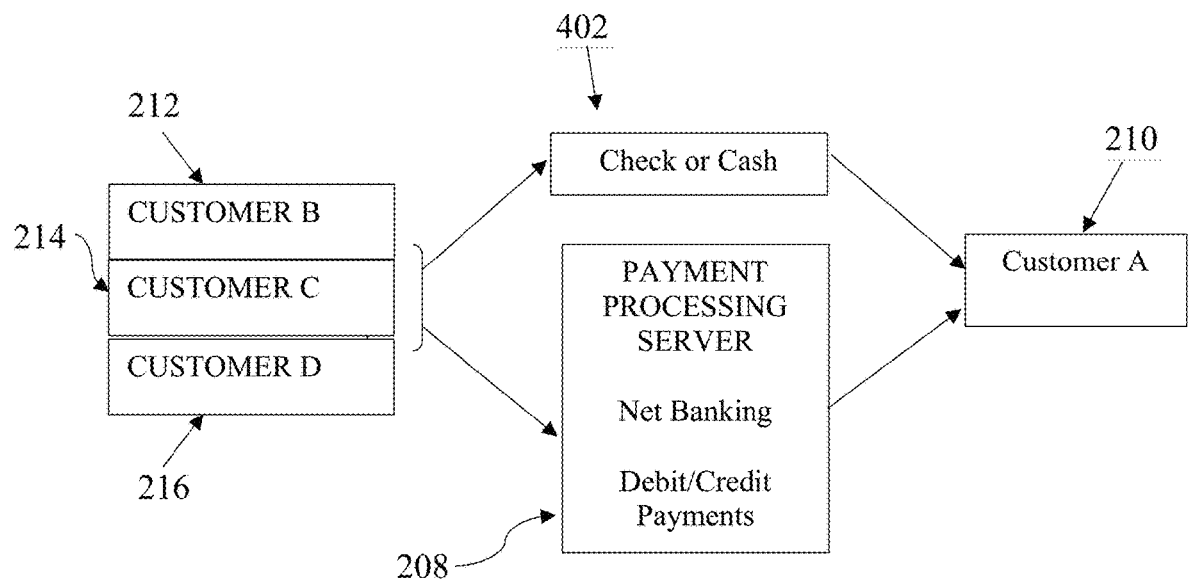
FIG. 5 is a block schematic diagram illustrating transaction payment options available to customers recruited by the initial customer, in an example embodiment.

FIG. 5 shows several example mechanisms for payment of the authorized membership resale fee by referral customers B, C, and D to the referring customer A so as to obtain one of customer A's referral keys. Customers B, C, and D can pay Customer A directly using cash, check, or other physically deliverable payment. Alternatively, customers B, C, and D can use their devices 212, 214 and 216 respectively to transmit payment to customer A's device 210 via a variety of payment mechanisms available through payment processing server 208 as described previously, or thorough other available networked payment services.

Figure 6A:
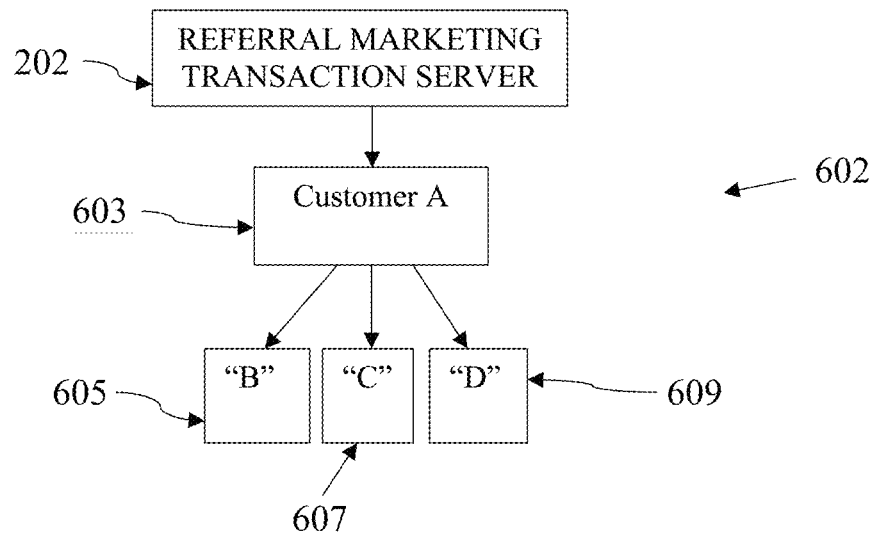
FIG. 6a is a diagram illustrating the creation and allocation of user identification keys in an example embodiment.

FIG. 6a illustrates an example of a referral "block" structure 602 used in some embodiments to enable and manage marketing referrals. The block structure is preferably a flat structure and thus does not establish any multi-level marketing relationships. As shown in FIG. 6a, referral marketing transaction server 202 stores information defining referral block 602, which is a hierarchical structure that identifies a block originator 603 (the referrer or recruiter, customer A) and a single level of K persons recruited by customer A. In the example of FIG. 6*a*, K=3 so customer A's block is completed by customers B, C, and D at 605, 607, and 609 respectively. Customer A receives incentives for recruiting customers B, C, and D. To participate in customer A's block, customers B, C, and D have paid a resale program fee to customer A that entitles them to become recruiters and receive incentive rewards. However, customer A receives only the authorized resale fee that customers B, C, and D pay to join the program. Customer A does not receive any further incentive or reward based on the performance of customers B, C, or D. Further, customer A's incentive reward for recruiting customers B, C and D is received by customer A regardless of whether customers B, C and D undertake any actual activity, and regardless of whether their activity is productive. Thus, the present system provides a relatively simple single-level referral program and not a multi-level marketing system.

Figure 6B:
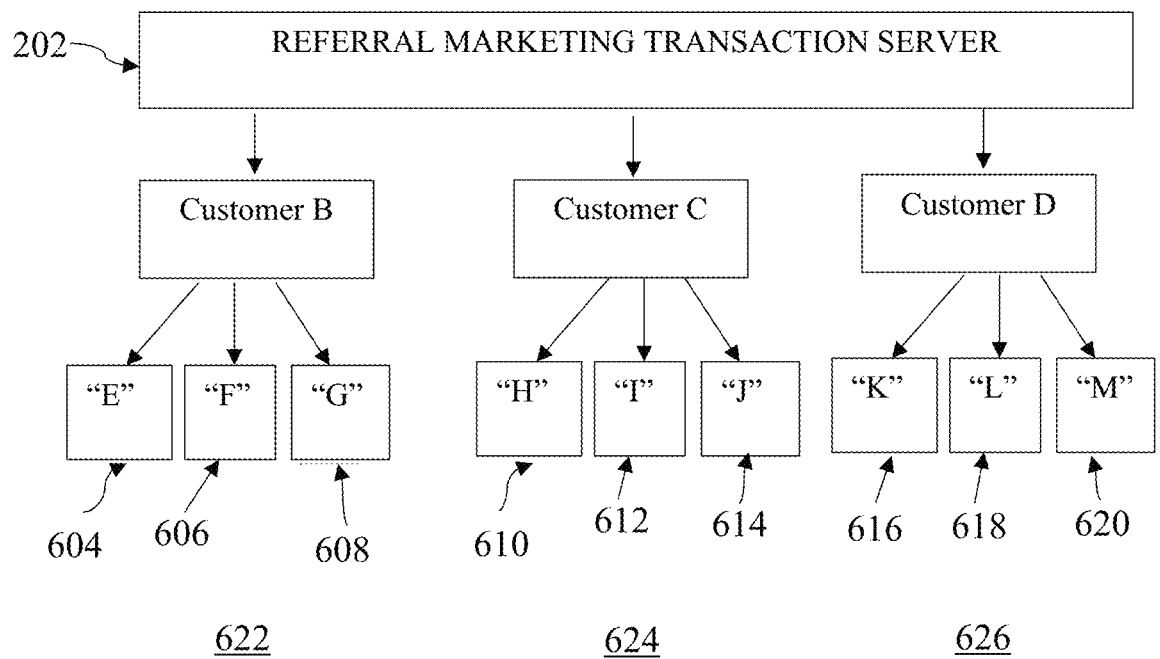
FIG. 6b is a diagram illustrating the creation and allocation of user identification keys to members recruited by an initial member, in an example embodiment.

FIG. 6*b* illustrates the operation of an example embodiment in which customers B, C, and D recruited by customer A to join the referral block of FIG. 6*a* are each given their own set of referral keys to distribute, defining new referral blocks 622, 624, and 626. In these blocks customers B, C, and D respectively occupy the top positions. For simplicity, blocks 622 624 and 626 are shown with K=3 although it will be understood that a larger or small number of keys could be associated with each block. Block 622, headed by customer B, is filled by customers E, F, and G (604, 606, 608). Block 624, headed by customer C, is filled by customers H, I, and J (610, 612, and 614). Block 626, headed by customer D, is filled by new customers K, L, and M (616, 618, 620).

The number of participants in each block, and the ratio of the purchase amount to the registration fee, can both be varied as desired within the broad scope of the present invention. In one example embodiment, particular advantages can be achieved by establishing a block that has four participants (one originator and three subscribers) in combination with a 1:2 ratio of purchase amount to registration fee. With this structure and ratio, a block originator who successfully completes his/her block with three paying subscribers will receive exactly twice the amount of his original investment at the time the block is completed. Further, the originator will also have received the purchased product at zero net cost. The block originator can thus fairly claim to have both doubled his referral marketing membership fee and received a free product, providing strong viral motivation for others to participate in the system.

The inventor has determined that it is desirable to provide a meaningful profit motive for participation in the system, while at the same time limiting the number of people who must be recruited for the participant to receive the target reward. By filling a five-person, six-person or even larger block, the block originator can earn the same total incentive while charging a lower membership resale fee to each participant. However, recruiting a larger number of block participants may be an obstacle for some block originators that would prevent them from completing their block. This fact motivates the inclusion in some embodiments of an option for recruiting targets as low as two or three persons. The inventor has determined that nearly all block originators will know three people who will subscribe to the originator's block. Thus, if only three people must be recruited to achieve the target result of doubling one's investment and obtaining a free product or service, the number of originators who are disappointed by the system architecture and their personal results will be relatively low. However, the number of referral keys generated in each block, and the potential income to the originator from referrals that result in new block origination fees, can be varied within the scope of the invention, including but not limited to the variations described in additional example embodiments described herein.

In an embodiment, each customer's participation in the referral program confers upon that customer a "membership" that provides additional value for both the customer and the merchant. The merchant will preferably communicate regularly with referral program participants (members) to offer special opportunities to purchase products at a discount or to receive other incentives, benefits and membership perquisites. Access to group-membership-based plans such as insurance plans, pharmacy discounts, and other programs and services can also be provided to referral program members.

The referral keys described herein can be created and implemented using any desired code scheme. In a preferred embodiment, each referral key is unique and consists of 15 randomly generated alphanumeric characters. The key may be transmitted without specific customized encryption in electronic communication between the system server and the merchant server. Those skilled in the art will appreciate that such communications streams typically have overall security protection using secure socket layer (SSL) or other widely available encryption methods and the overall channel encryption will provide some level of protection against improper reception and use of activated referral keys.

Referral keys received by the system server from merchant servers in the context of any transaction are preferably authenticated by the system server in a process that includes at least receiving a confirmable electronic token from the merchant and checking that the transaction information was received from an IP address in the known range of addresses for the merchant's server. The electronic token provided by the merchant is preferably a unique encrypted authentication pass code provided to each merchant. One merchant therefore cannot access the transactions of, or use the referral keys assigned to, another merchant whose operations are supported by the same system server.

Similarly, when requesting new unique referral keys from the system server to be issued to a new block originator, the merchant server must authenticate itself to the system server. Each user (block originator or other participant) must authenticate their identity through username and password, biometric identification, or other access control procedures in order to access the referral keys through the merchant server or mobile applications.

Further details of the downloadable application described previously will now be provided with particular reference to the example embodiments illustrated in FIGS. 7-26. Those skilled in the art will appreciate that while the example described herein is a downloadable application suitable for operation in portable devices used by customers participating in the referral marketing program, the functionality described herein can be achieved in a variety of combined hardware and software architectures. The inventor contemplates that similar functionality may also be provided through a website, kiosk, or any other computing platform accessible to one or more customers, within the intended scope of the invention.

Figure 7:
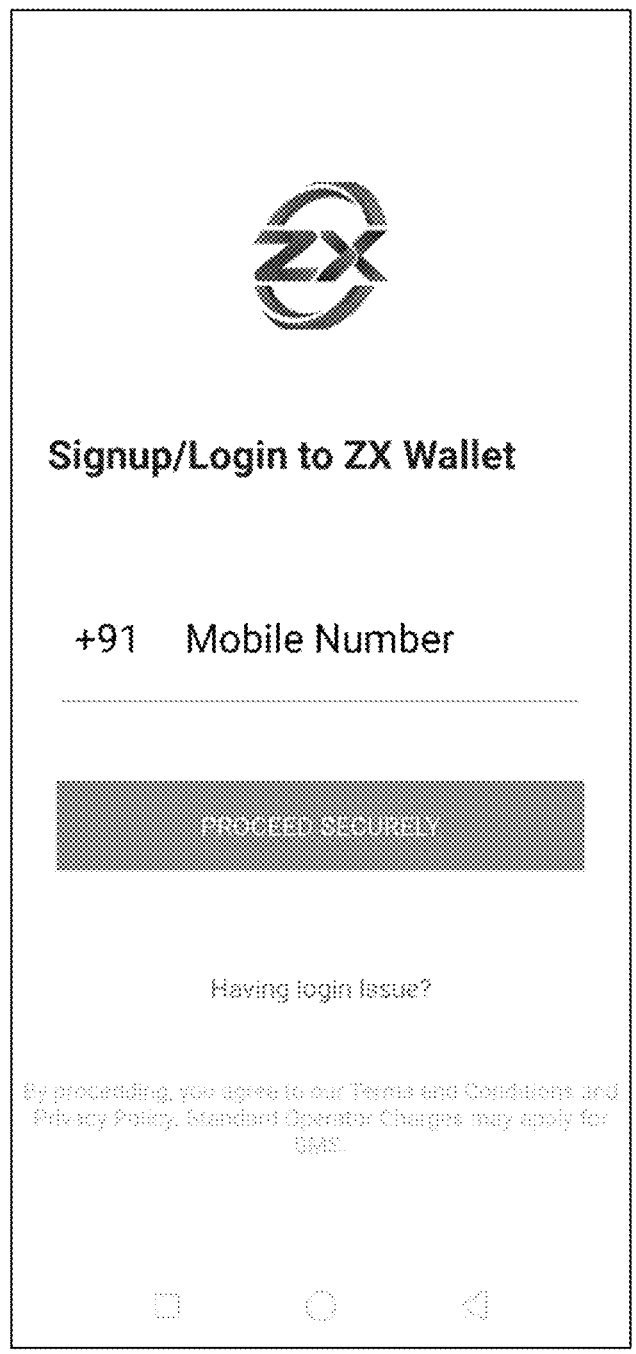
FIG. 7 is an illustration of a first login screen used in a downloadable application distributed to customers in an example embodiment.

FIG. 7 is an illustration of a first login/account setup screen used in the example downloadable application. This screen allows the user to enter their mobile telephone number and then select "proceed," transmitting the mobile number to one or both of the referral marketing transaction server 202 and the Merchant 1 online sales server 204, to be communicated between those servers as needed for operational purposes.

Figure 8:
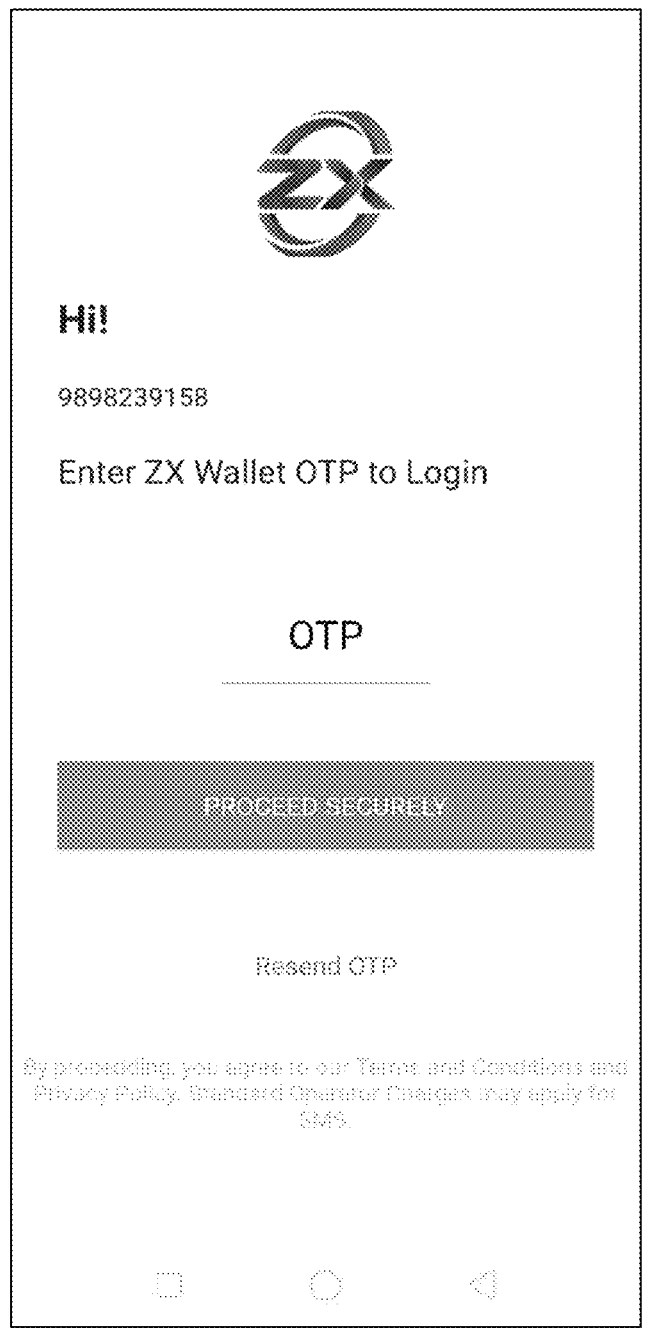
FIG. 8 is an illustration of a second login screen used in a downloadable application distributed to customers in an example embodiment.

FIG. 8 is an illustration of a second login/account setup screen used in the example application. The server that receives the user's mobile number, transmission of which was initiated via the screen of FIG. 7, sends a one-time PIN to the mobile device via SMS or other available data communications service. The user enters the PIN in the screen of FIG. 8 to proceed.

Figure 9:
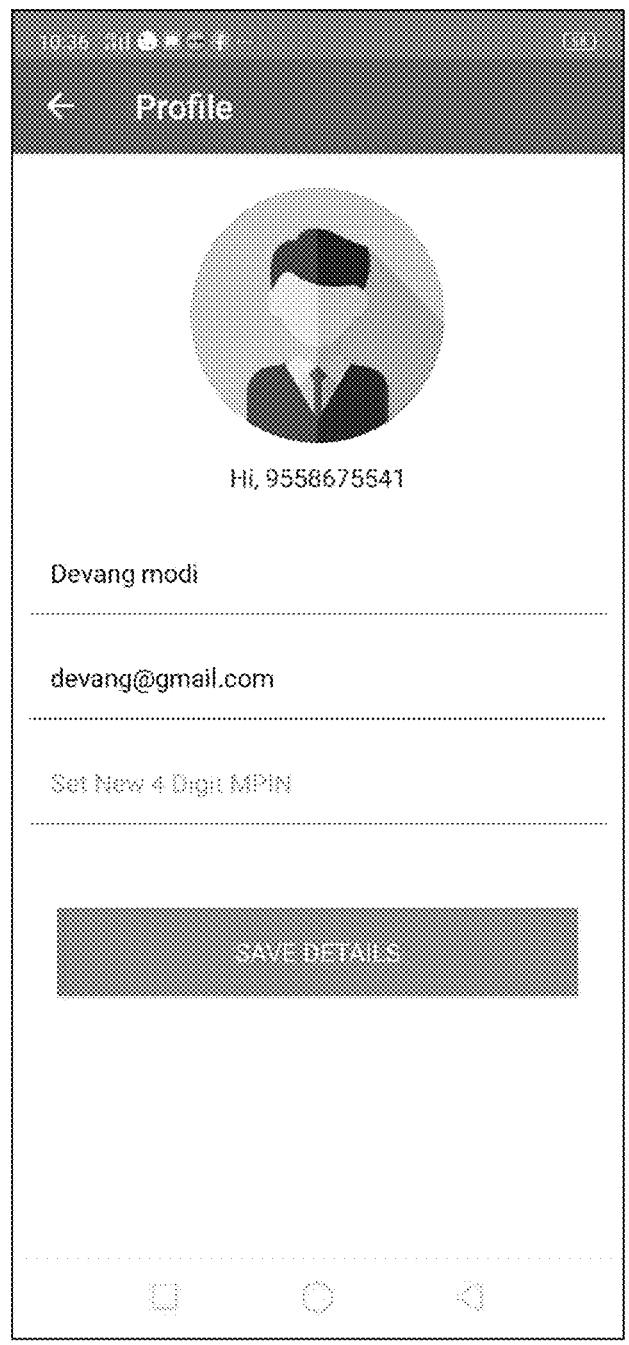
FIG. 9 is an illustration of a customer profile screen used in a downloadable application distributed to customers in an example embodiment.

FIG. 9 is an illustration of a customer profile screen used in the present example application. In this screen, the user can enter his/her name, email address, and select or change a personal identification number used to access the application.

Figure 10:
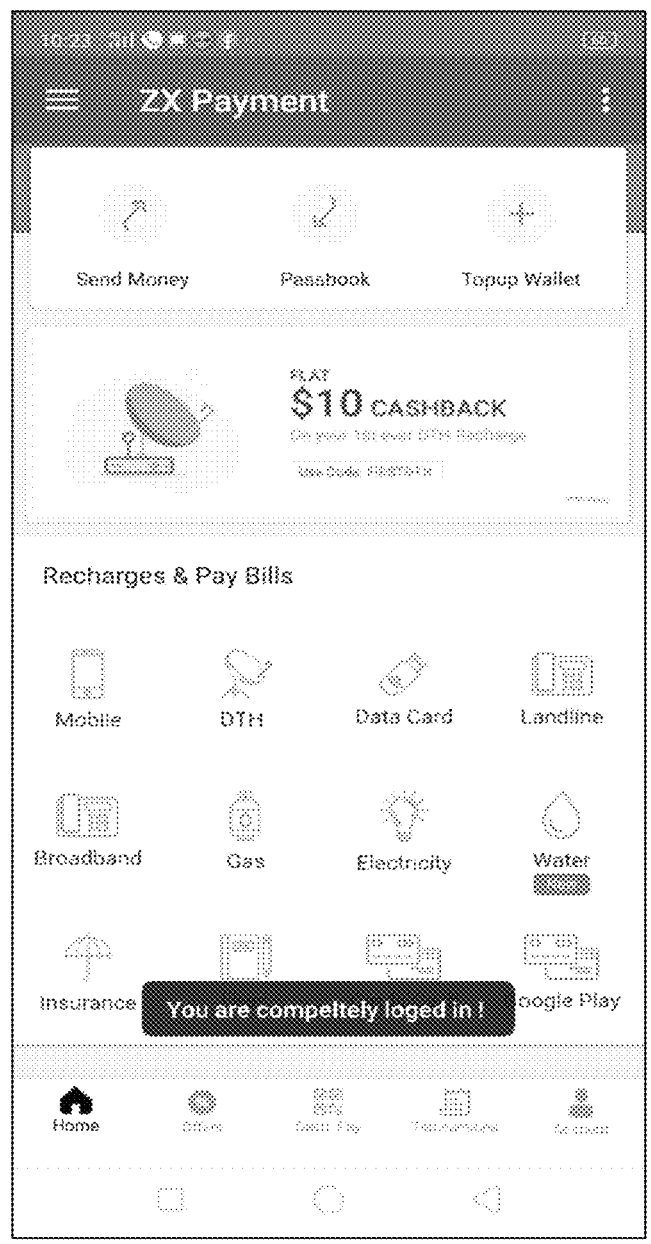
FIG. 10 is an illustration of a main payment menu screen used in a downloadable application distributed to customers in an example embodiment.

FIG. 10 illustrates a main payment menu screen of the example application. The payments menu may provide a variety of functions, including establishing and maintaining an electronic wallet and performing financial transactions such as sending and receiving money and paying bills.

Figure 11:
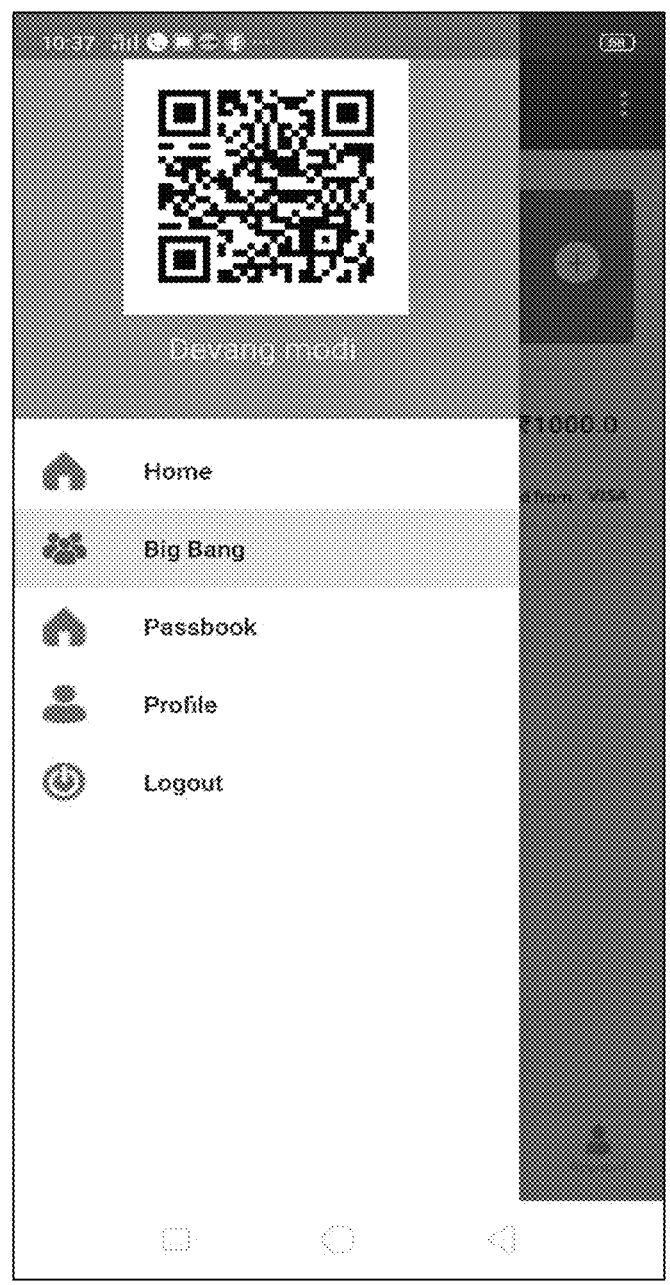
FIG. 11 is an illustration of a menu and QR code display screen used in a downloadable application distributed to customers in an example embodiment.

FIG. 11 is an illustration of a main menu and QR code display screen that implements referral marketing program functions in an example application. The menu provides access to the home screen, a record of the customer's referral marketing blocks (identified as "Big Bang"), a passbook, profile function, and logout functions.

Figure 12:
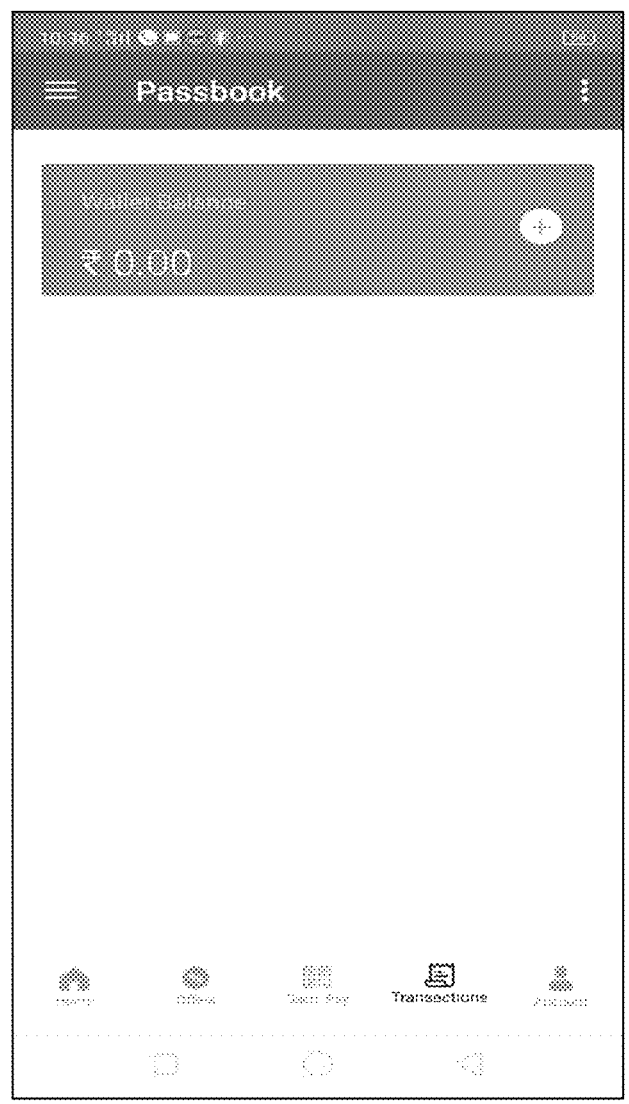
FIG. 12 is an illustration of an account balance screen used in a downloadable application distributed to customers in an example embodiment.

FIG. 12 illustrates an example passbook or account balance function accessed from the main menu of FIG. 11.

Figure 13:
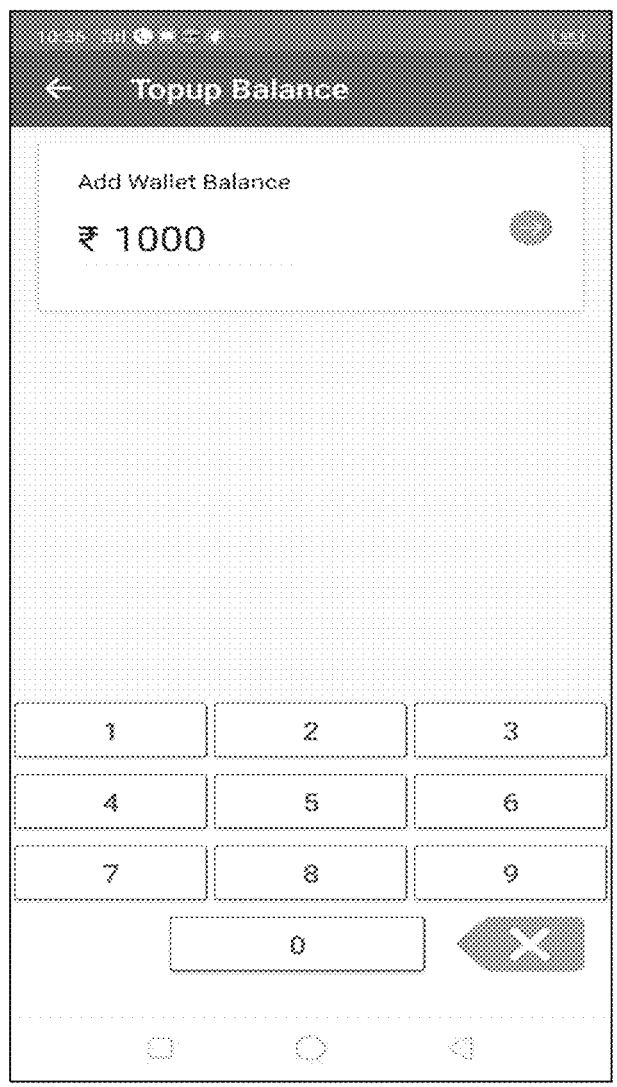
FIG. 13 is an illustration of an account deposit screen used in a downloadable application distributed to customers in an example embodiment.
Figure 14:
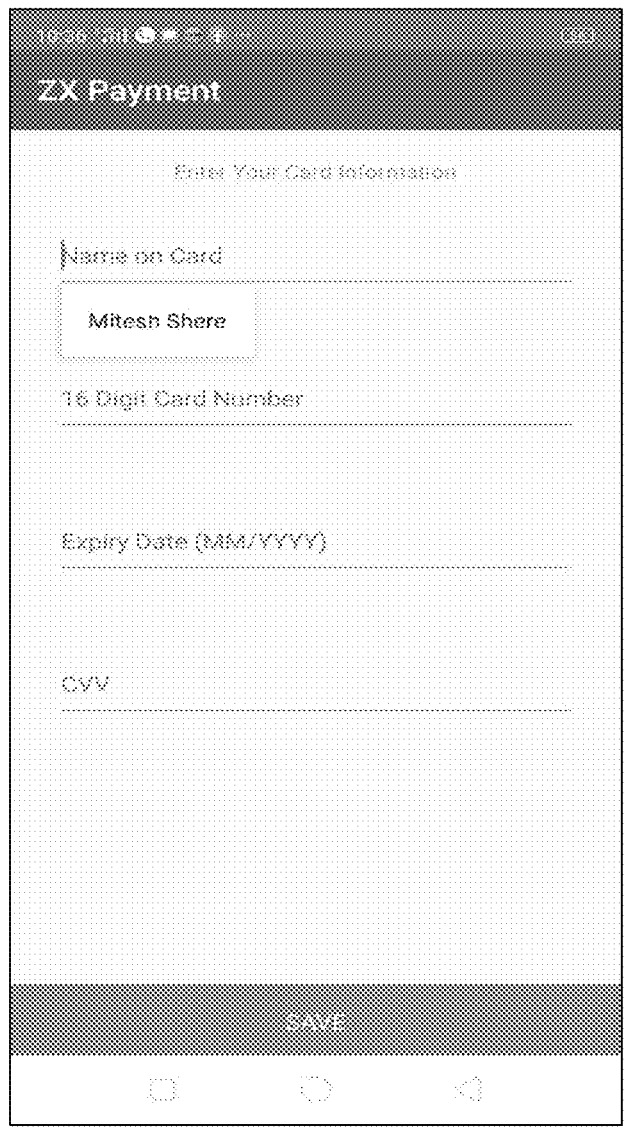
FIG. 14 is an illustration of a payment screen used in a downloadable application distributed to customers in an example embodiment.
Figure 15:
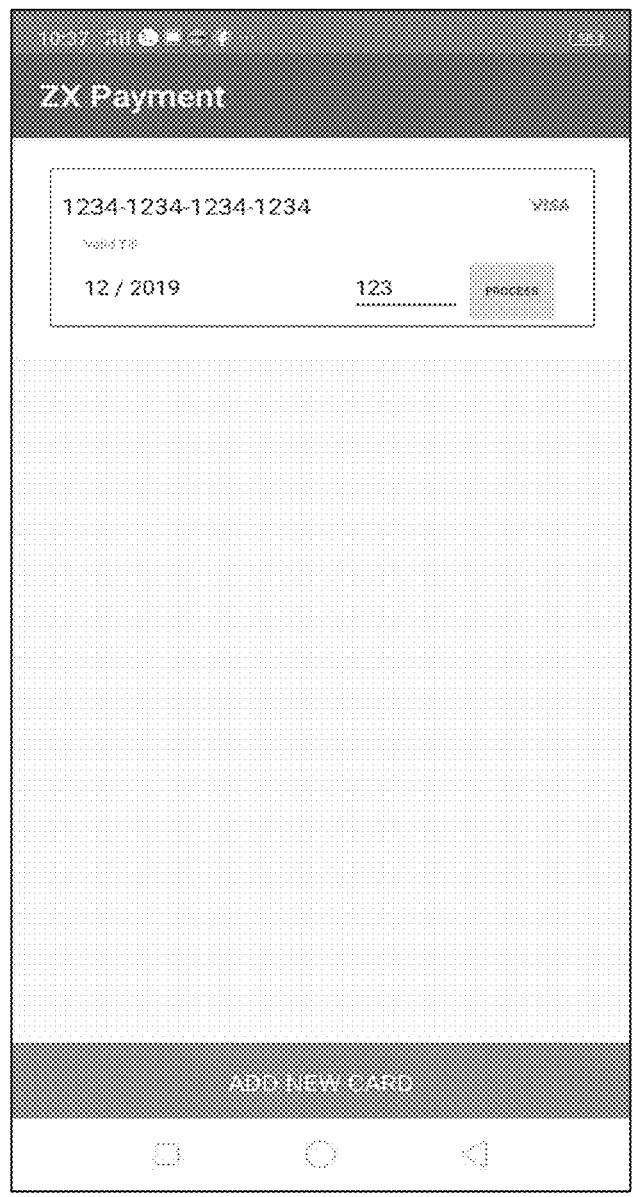
FIG. 15 is an illustration of a stored payment methods screen used in a downloadable application distributed to customers in an example embodiment.

FIG. 13 shows a sample account deposit or "topup" screen accessible in connection with the passbook function in FIG. 12. FIG. 14 shows a sample screen for receiving entry of a payment method to be used, for example, in the topup function illustrated in FIG. 13. After entry of the payment method using the screen in FIG. 14, the payment method appears on the stored payment method screen shown in FIG. 15.

Figure 16:
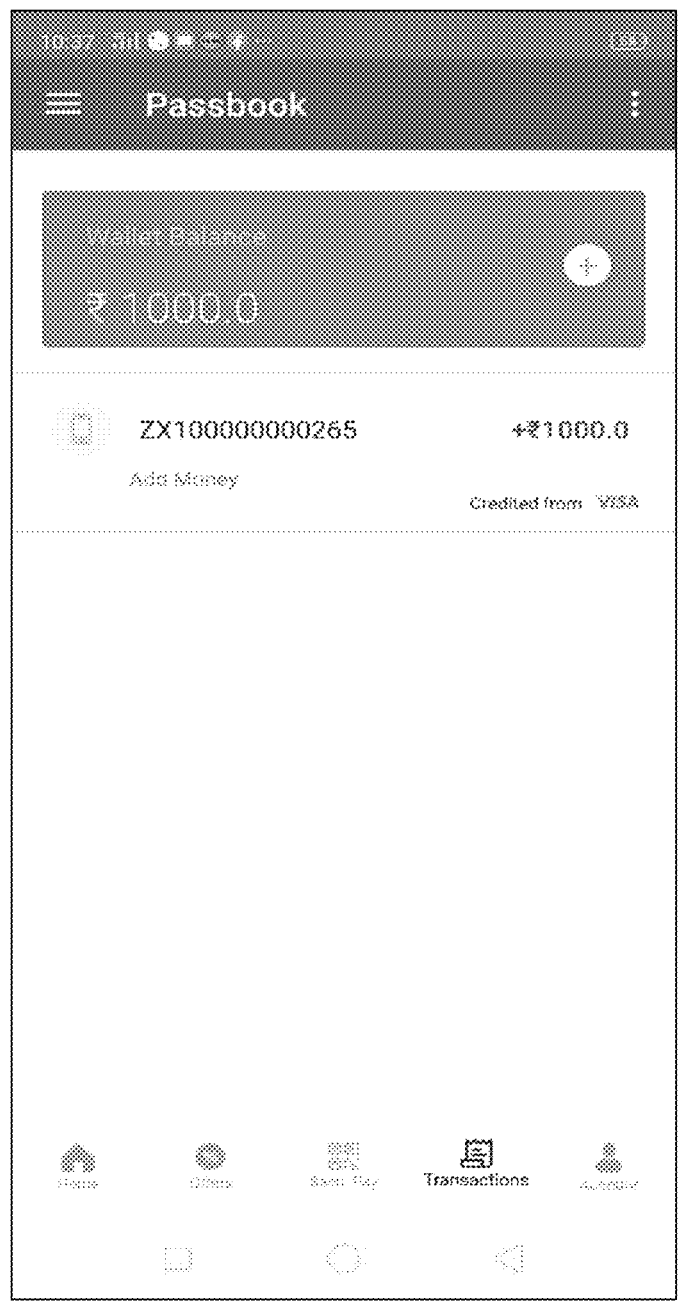
FIG. 16 is a further illustration of a passbook balance screen used in a downloadable application distributed to customers in an example embodiment.

FIG. 16 shows an example of the passbook balance screen of FIG. 12, illustrating a record of an addition of funds that results in a new increased balance.

Figure 17:
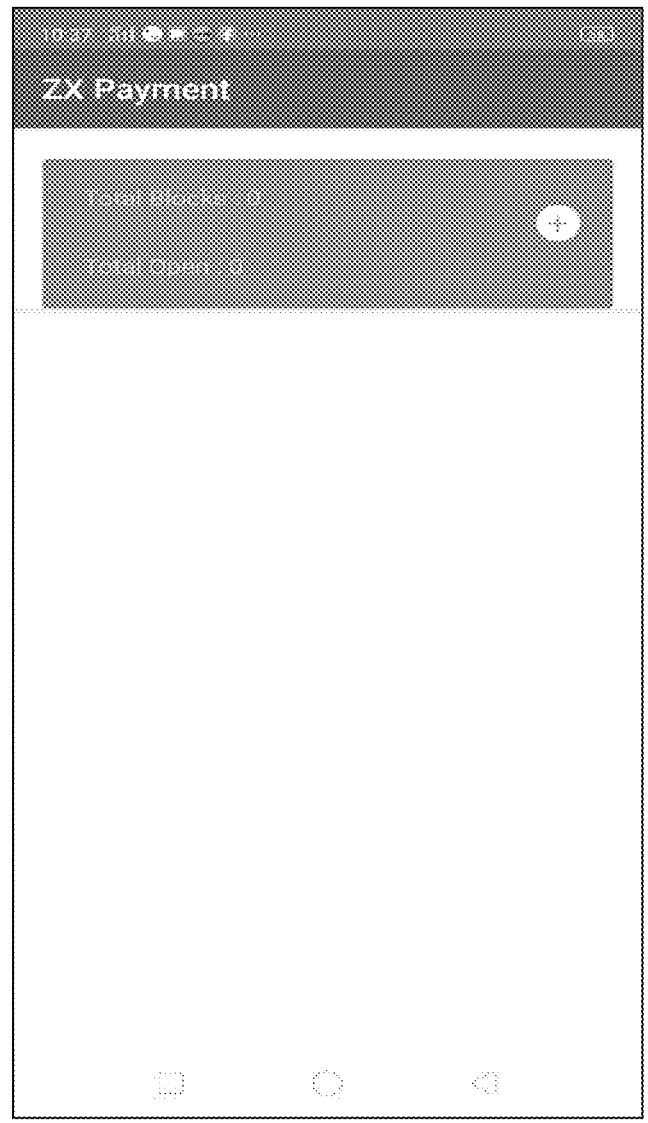
FIG. 17 is an illustration of a referral block record screen used in a downloadable application distributed to customers in an example embodiment.

FIG. 17 shows an example of a referral block record screen used in the application. The display screen of FIG. 17 reflects that the user is not yet participating in any referral blocks.

Figure 18:
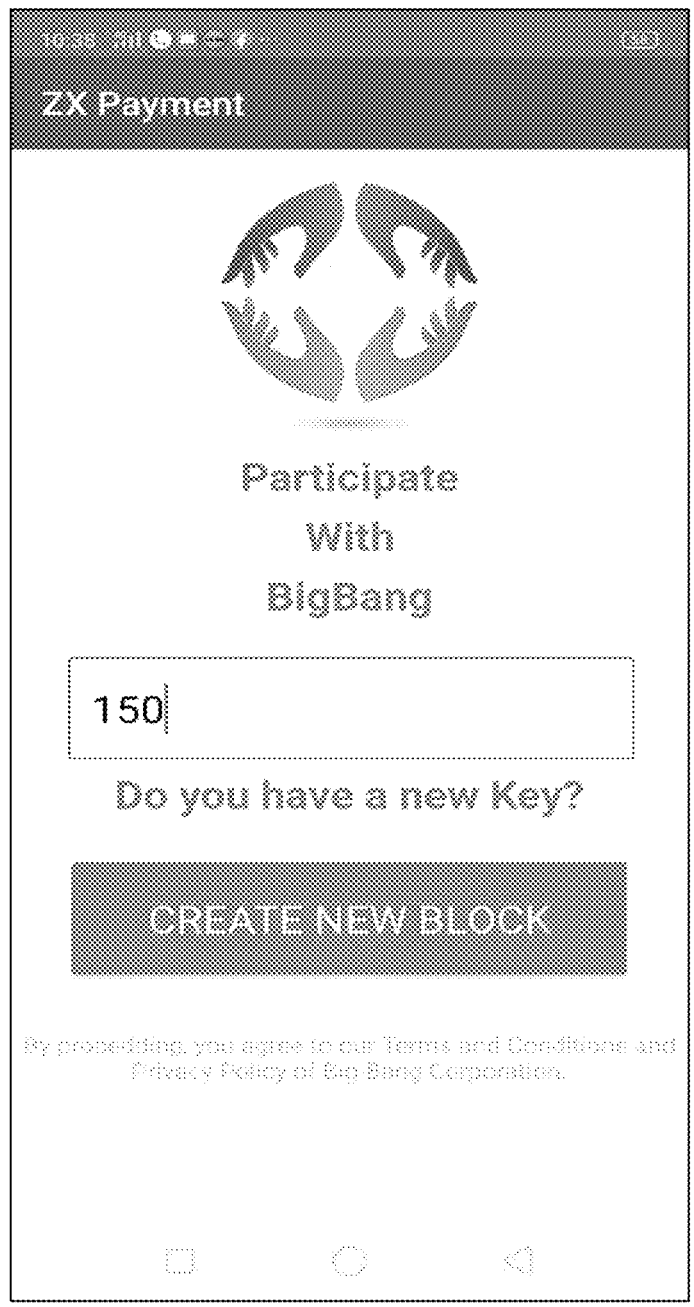
FIG. 18 is an illustration of a referral key entry screen used in a downloadable application distributed to customers in an example embodiment.
Figure 19:
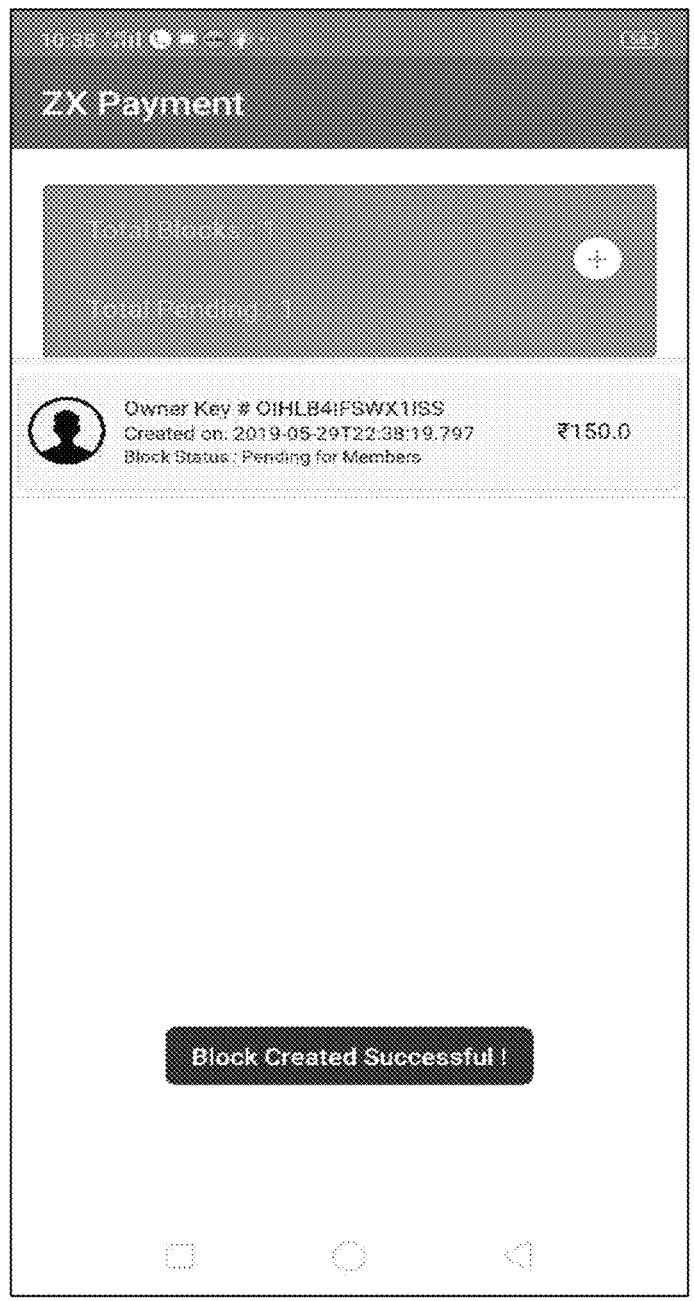
FIG. 19 is an illustration of a referral block record screen showing an established referral block, as used in a downloadable application distributed to customers in an example embodiment.
Figure 20:
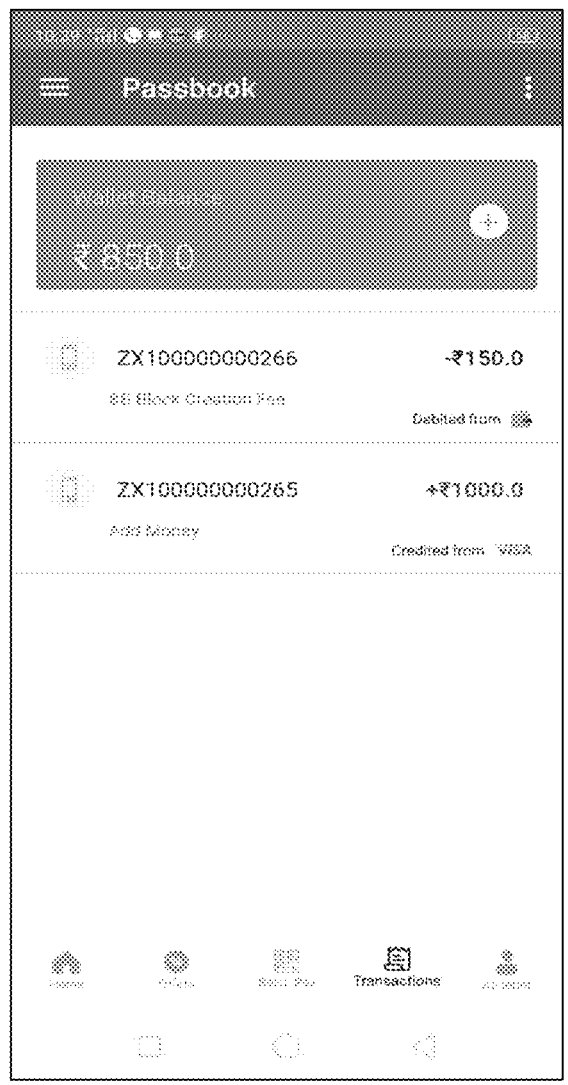
FIG. 20 is a further illustration of the transaction record screen used in a downloadable application distributed to customers in an example embodiment, showing initial referral transactions.

When a user wants to create a referral block, he/she preferably navigates to the screen shown in FIG. 18 which is an example of a block creation screen. This screen allows entry of a referral key received by the user from another participant in the program. Upon creation of the new block, the block record screen of FIG. 17 will change to reflect the new block creation, as shown in the example embodiment of FIG. 19. FIG. 20 is an example passbook balance screen that reflects processing of a payment from the previous wallet balance to pay a block creation fee.

Figure 21:
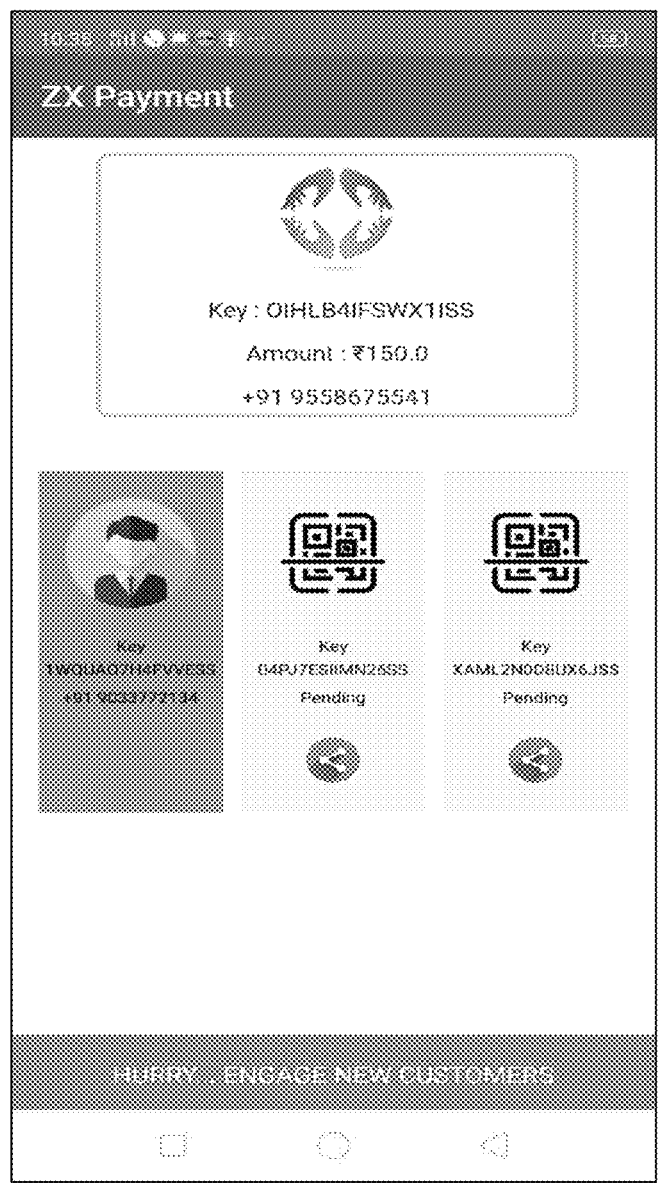
FIG. 21 is an illustration of a referral block status screen used in a downloadable application distributed to customers in an example embodiment.

FIG. 21 is an example of a referral block status screen that graphically illustrates the block hierarchy and the relationship between the user and persons receiving referral keys from the user. In FIG. 21, one of three keys issued to the user upon creation of the displayed block has been given to a recruit, and the other two keys are shown with the status pending and unassigned.

Figure 22:
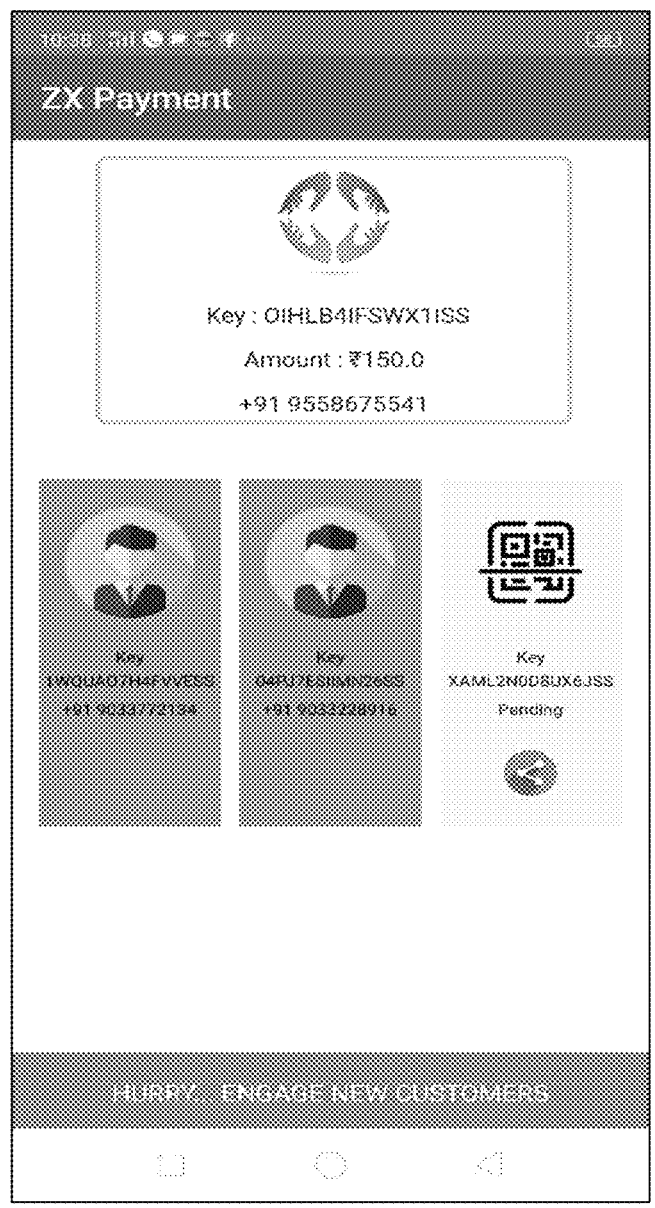
FIG. 22 is an illustration of a referral block status screen showing two blocks filled, in an example embodiment.

In this example embodiment, when a second of the three keys in the block of FIG. 21 has been assigned to a recipient, the status display changes to the example shown in FIG. 22. Finally, when all three keys have been issued the status display changes to the example of FIG. 23. Preferably the keys that have been issued and keys that are still available are shown in different colors on the status screens to better highlight their condition.

Figure 23:
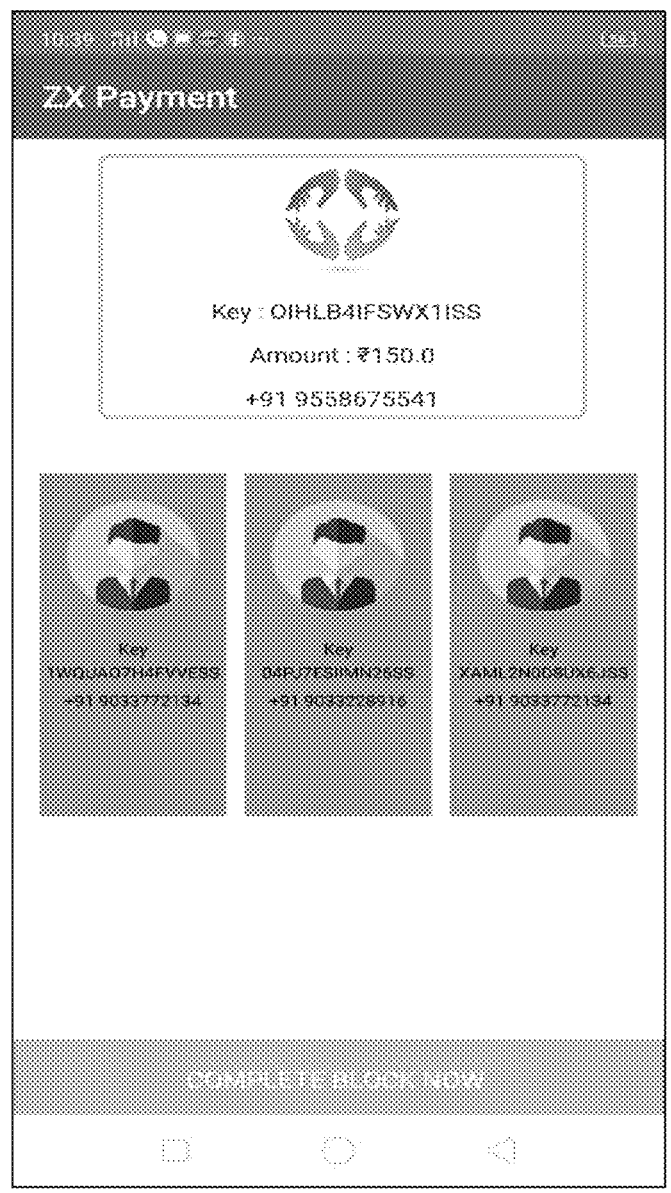
FIG. 23 is an illustration of a referral block record screen showing three blocks filled, in an example embodiment.
Figure 24:
FIG. 24 is an illustration of the payment screen in an example embodiment, showing payment of referred customer membership fees to complete the block.

Upon issuance of all of the available keys in the block, the user is invited to close the block, such as by using the activation bar at the bottom of FIG. 23. Alternatively, the block can be closed automatically by the system. FIG. 24 shows the example block status screen of FIG. 23, updated to indicate that the block has been closed.

Figure 25:
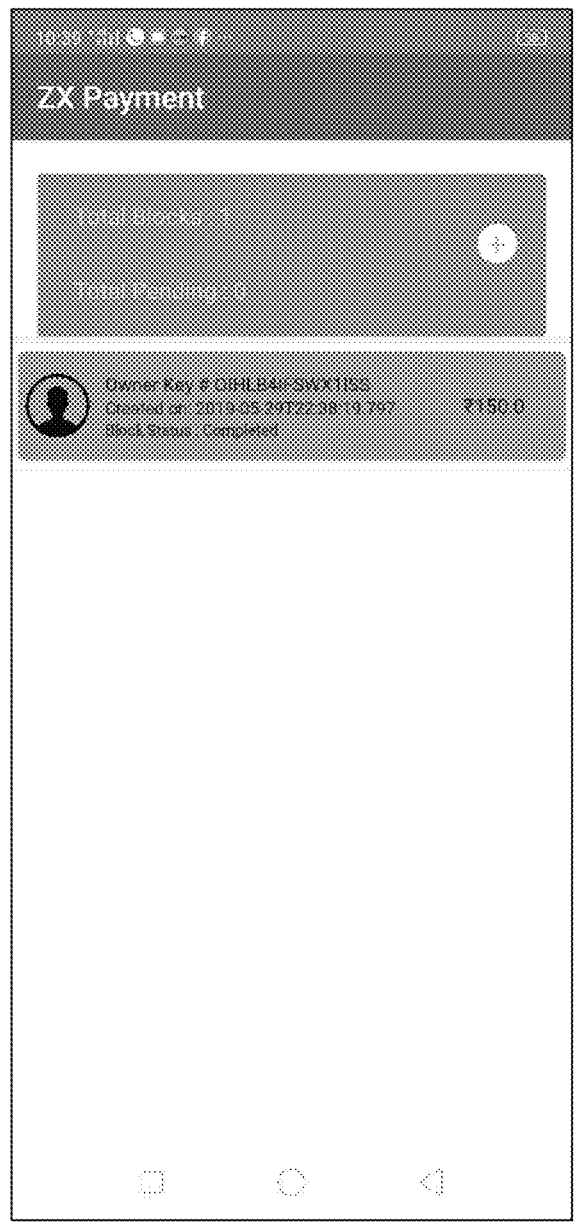
FIG. 25 is an illustration of a referral block record screen showing a completed referral block in an example embodiment.
Figure 26:
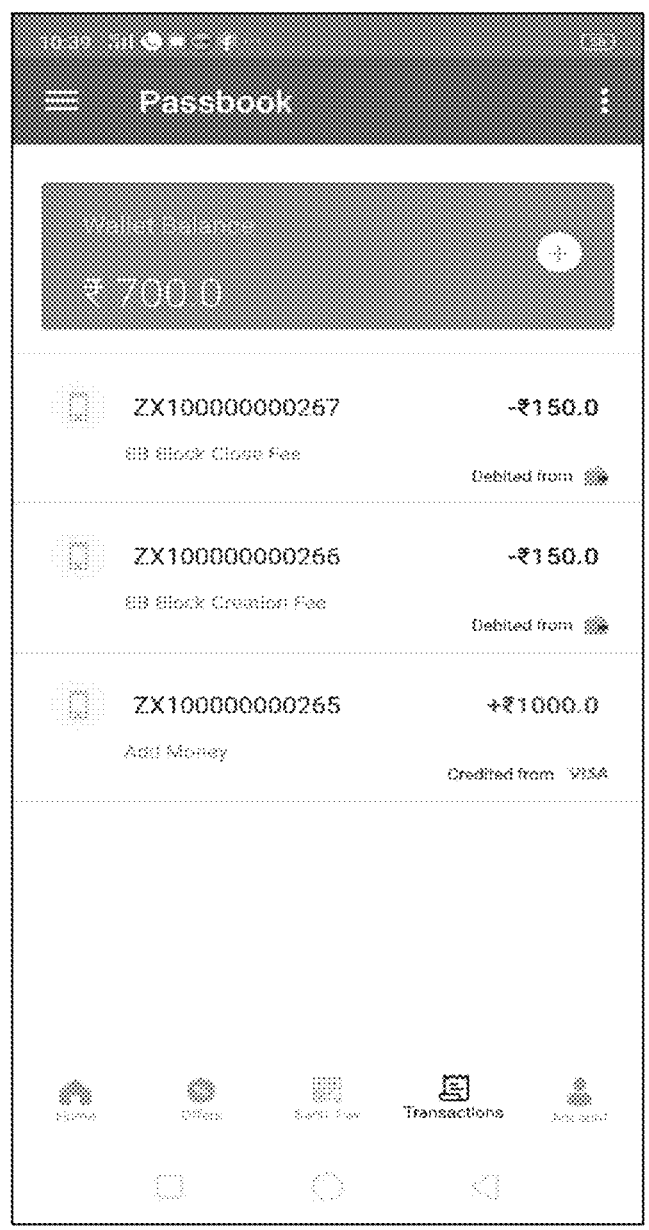
FIG. 26 is an illustration of a payment record screen showing confirmation that a referral block was completed, in an example embodiment.

FIG. 25 shows a summary of block status indicating that the user has participated in one block, with no blocks still open. FIG. 26 is another example of a passbook balance screen.

FIGS. 27a through 27d together represent a flow chart showing a process implemented in a further embodiment. This embodiment is preferably implemented using network architectures and downloadable applications similar to those described herein with reference to FIG. 2 through FIG. 26. However, the embodiment of FIGS. 27a-27d provides the block originator with additional options in selecting how the new block will be implemented.

Referring first to FIG. 27a, the process starts in step 2702 where Customer A downloads an application such as the application described herein with reference to FIGS. 6-26. In the example, this application is distributed by a company engaged in selling products or services, identified in the example as company XYZ. Next, in step 2704, customer A creates an account or logs into an existing account. In step 2706, customer A uses the XYZ application to access XYZ's catalog of products and services and selects a product or service to be purchased and proceeds to check out.

Next, in step 2708, the application offers customer A the opportunity to participate in a referral marketing program. The offered opportunity preferably has features and functions implementing selected embodiments of the marketing processes and systems that are described and suggested throughout this disclosure to those of ordinary skill in the relevant art. If customer A declines to participate in the referral program, the process continues at step 2710 and customer A completes his or her purchase in a conventional manner.

If customer A elects to participate in the program described herein, the process continues at step 2712.

If A was referred to XYZ by a customer already participating in the marketing program, and thus was given a referral code or "key" after paying a referral fee to an existing participant, the process continues at step 2714 where the participation key code is linked to customer A in the referral marketing server's database. In the present example, the marketing program and the referral marketing server are preferably administered by an organization under contract to XYZ. The administering organization will be identified herein as BB. Here, BB tracks the assignment of referral codes to individual participants and maintains records of the referrals made by each participant. The process then continues via connector "B" at step 2718 shown in FIG. 27b, as will be described in more detail below.

If at step 2712 customer A wants to participate in the marketing program but was not referred by another participant, the process continues at step 2716. In step 2716 the application offers customer A options for participation. An initial option is to choose a number of referral keys to be provided to customer A. This number represents customer A's self-determined goal of how many people customer A believes he/she can persuade to (1) make a purchase at XYZ, and also (2) pay to customer A a referral program resale fee to join the marketing program.

Customer A, in this block origination step, can choose to establish a block that has K referral keys, where K is a number within a predetermined range selected by the administrator. In the present example, customer A can preferably select from K=2 to K=7 referral keys in creating the new block. However, the upper limit for K can theoretically be any value.

The options presented to customer A may also include a choice of a target income level to be realized if customer A achieves their selected goal of recruiting K customers into the program. In the embodiment of FIG. 27a-27d the originator is preferably allowed to select, within practical limits defined and determined by the program administrator, one or more desired multipliers for potential referral income. In this example, the originator may elect to create a block with a referral fee structure designed to generate block creation referral income to the originator of 1.5, two, three, or some other number times the amount originally paid. In this way, if the originator is successful in referring K purchasers to the company and collecting block creation fees from each of those contacts, the originator will ultimately have earned referral fees equal to some multiple of the total amount paid by the originator for (1) the product or service purchased and (2) his/her block origination fee.

Figure 27B:
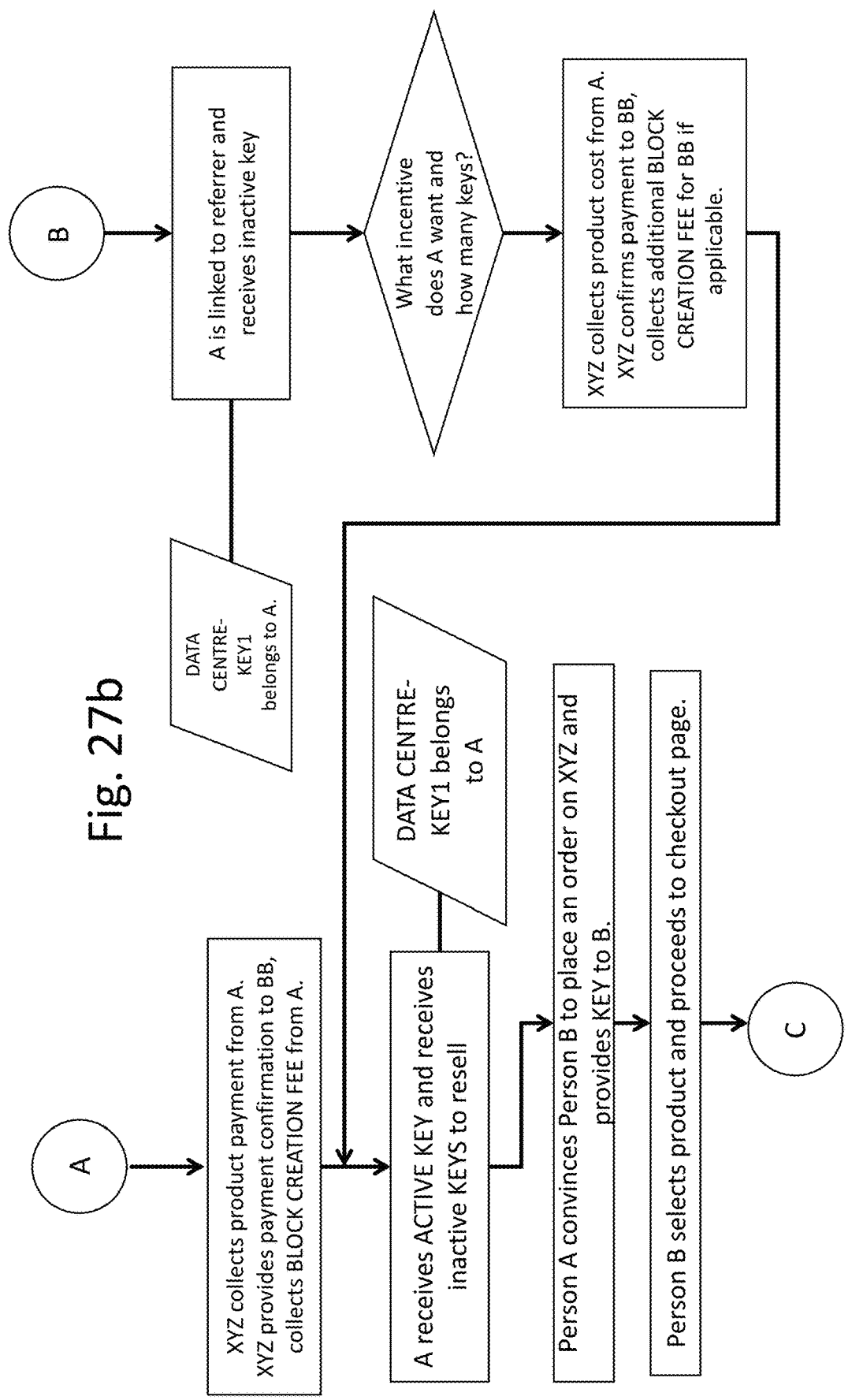
Figure 27C:
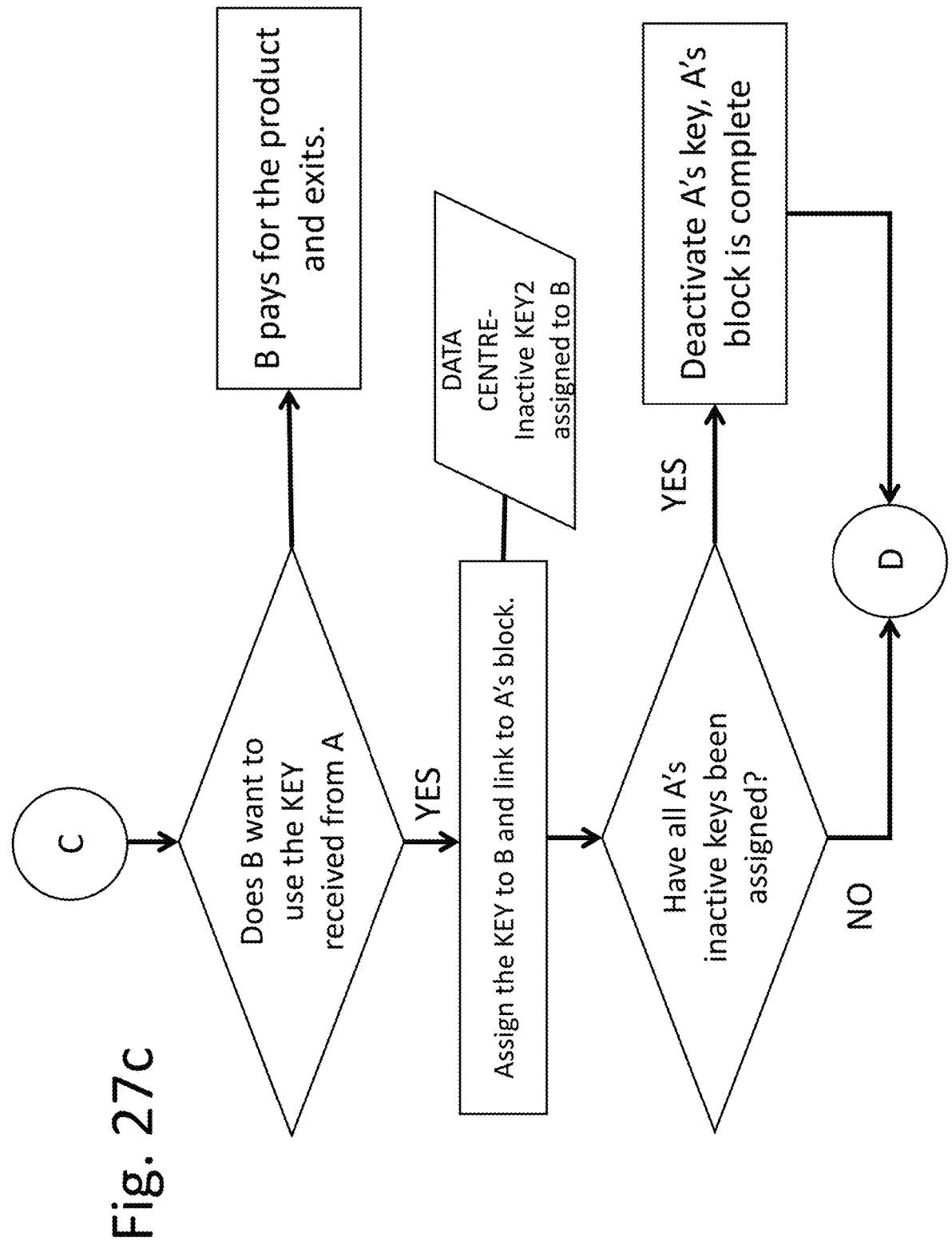

After customer A selects the desired incentive level and number of keys K to be assigned, the process continues via connector "A" to step 2720 shown in FIG. 27b. In step 2720, XYZ collects payment from customer A for the product or service that customer A wanted to purchase. XYZ provides confirmation of the purchase transaction to BB and collects from customer A on BB's behalf the applicable block creation fee.

In this example embodiment, the block creation fee in the basic case is preferably determined according to the following formula:

$$BCForig = (K*Co)/(K-in)) - Co \qquad \text{(Equation 1)}$$

where BCForig is the total block creation fee to be paid by customer A for the selected product, K is the number of keys (recruits) selected by customer A, "in" is the incentive level or income multiplier selected by customer A, and Co is the cost of the XYZ product or service selected by customer A for purchase. To keep the denominator of the equation a non-zero and positive number, K should always be greater than the incentive level.

The following table shows examples of this calculation for K=3 to 7 at a product price of Co=$10 and a target incentive level of in=2.

| K = Number of people to be recruited | BCForig |
|---|---|
| 3 | 20.00 |
| 4 | 10.00 |
| 5 | 6.67 |
| 6 | 5.00 |
| 7 | 4.00 |

A modified formula is preferably used in cases where a customer (e.g. customer B) initiating creation of a new block selects block parameters resulting in a block creation fee that is less than the block creation fee paid to the customer recruiting them (e.g. customer A). In such cases, customer B will have a credit balance in their block creation fee account. If customer B wants to achieve the full "in" incentive level and recover that credit balance in cash, customer B must require his/her recruits to reimburse customer B for his/her block creation fee at a higher level.

The per-key reimbursement that must be charged by customer B to achieve this goal (referenced as quantity BCF2) can be calculated by:

$$BCF2 = ((in*(BCF1+C1)) + (BCR-BCF1))/K1 \qquad \text{(Equation 2)}$$

where C1 is the cost of the product customer B has selected, BCF1 is the value of block creation fees previously paid by customer B to customer A, BCR is the block creation fee for customer B's desired block characteristics according to Equation 1, "in" is the desired incentive level of customer B, and K1 is the number of people that customer B wants to recruit (number of keys to be issued).

The previously described process branch performed when customer A was referred by another participant will now be described in more detail. Processing for that branch continues in step 2718. Information on customer A is provided to BB's server and customer A is registered and linked to their referrer in the BB database. Then, in step 2722, customer A is offered and selects options for a desired incentive level and number of keys, in a manner substantially identical to the choices and selection previously described with reference to step 2716.

In step 2724, XYZ collects payment from customer A for the product or service that customer A wanted to purchase. XYZ provides confirmation of the purchase transaction to BB. Note that in this logic branch of the process, customer A's referrer has already either paid a block creation fee to BB or paid a referral resale fee to another participating customer, either of which paid for customer A's participation in the program. Customer A has already paid a resale program fee to the customer who referred customer A to XYZ and to the marketing program. Thus, at the time of making his/her purchase and marketing program selections, customer A already has a block creation fee credit available in the amount previously paid to his/her recruiter. If customer A's selections result in a lower block creation fee than customer A's available credit, customer A will retain a credit for the unused balance. If customer A's selections result in a higher block creation fee than the existing credit, XYZ will collect the additional block creation fee due from customer A on BB's behalf and remit that amount to BB.

After either step 2716 or step 2724 has been completed, the two branches converge in step 2726 and the process continues there. In step 2726 the key assigned to customer A is made active and the key status is updated in the BB server's database.

Next, in step 2728, customer A starts to actively participate in the referral marketing program by persuading his contacts to both make a purchase from XYZ and to join the marketing program. In this way customer A will earn referral income using his/her personal contacts and network. As shown in step 2728, customer A initially persuades customer B to make a purchase and join the marketing program. Customer A gives customer B one of the inactive referral keys obtained by customer A when customer A joined the marketing program and collects from customer B an appropriate resale program fee. The resale program fee collected should not exceed the authorized resale program fee determined by the calculations set forth herein. Customer A will, by collecting this resale program fee from each recruit in exchange for the program membership key customer A can provide, will earn back the block creation fee that customer A paid to BB and earn a further referral incentive.

In step 2730, customer B downloads the application and creates an account or logs in, then selects a product or service to purchase from XYZ's offerings. The process then continues via connector "C" to step 2732 shown in FIG. 27*c*.

In step 2732, customer B is asked if they have a referral key. If for some reason customer B does not want to use the key received from customer A and join the marketing program, they can make the desired purchase in step 2734 without joining the marketing program. Assuming that customer B wants to use the key and join the marketing program, in step 2736 customer B provides the key (as received from A) to the application. The key is associated with B's account in the BB server and database and activated.

In step 2738, the BB server determines whether all of the keys in customer A's current block have been activated. If not, the process continues via connector "D" to FIG. 27*d*. If so, the process continues at step 2740, where customer A's block is identified as being complete. Customer A's active referral key in that block is then deactivated before the process continues to connector "D."

Figure 27D:
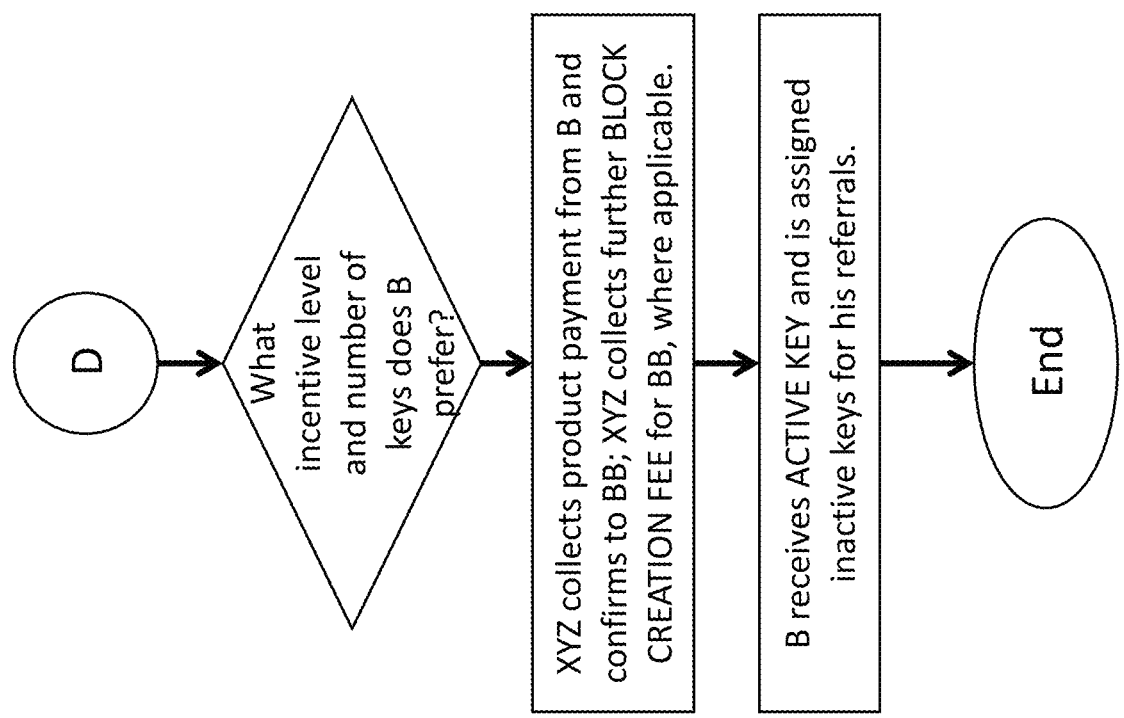

Following connector "D," as shown in FIG. 27*d*, in step 2742 customer B is given the same program participation choices given to customer A as previously described in step 2716. Then, in step 2744, XYZ collects the appropriate product payment from customer B and confirms the transaction by communicating with BB's server. XYZ may also collect any deficiency in the block creation fee paid by customer B and remit the additional funds to BB, in the same manner previously described with regard to customer A. Finally, in step 2746, customer B's key is activated; customer B receives inactive keys to be provided to his referrals who agree to make a purchase and participate in the marketing program.

The process just described is repeated for other customers referred to XYZ and to the program by customer A and customer B, and for other customers they refer. Each customer can repeat the process by referring additional people until they have referred K customers and their block is closed. A participant may participate in more than one block at a time, and after a participant has completed K referrals and their block is closed, they are preferably offered the option to start a new block.

Although illustrative embodiments have been described herein in detail, it should be noted and understood that the descriptions and drawings have been provided for purposes of illustration only and that other variations both in form and detail can be added thereto without departing from the spirit and scope of the invention. The terms and expressions in this disclosure have been used as terms of description and not terms of limitation. Thus, the breadth and scope of the present invention should not be limited by any of the above-described exemplary embodiments but should be defined only in accordance with the claims and their equivalents. The terms and expressions herein should not be interpreted to exclude any equivalents of features shown and described, or portions thereof.

I claim:

1. A method of processing referral marketing transactions for an online merchant, comprising the steps of:
   a. Providing a computerized referral marketing transaction server, said referral marketing transaction server connected via one or more data transmission networks to at least a first customer computing device used by a first customer;
   b. Establishing a computer network connection between said referral marketing transaction server and an online sales server configured to receive and process customer orders for the merchant;
   c. Electronically receiving at said merchant online sales server an order placed by said first customer using said first customer computing device, and receiving payment of an associated order price;
   d. Establishing, via an electronic connection between said first customer computing device and said referral marketing transaction server, a referral marketing account associated with said first customer;
   e. Creating a referral block record within said first customer referral marketing account defining a numeric referral goal to be met by the first customer, said goal constituting an integer number of customers that the first customer will refer to the merchant to earn a specified incentive;
   f. Automatically calculating a referral program fee due from the first customer to a referral marketing program operator, said referral marketing program operator being one of the merchant and an independent operator of the referral marketing transaction server, wherein the amount of said referral program fee is based at least in part on the numeric referral goal and varies based on the order price;
   g. The referral marketing program operator receiving from said first customer a payment or other credit equal to said referral program fee, activating said first customer referral record, and providing to said first customer one or more digital referral key codes in a quantity equal to said numeric referral goal;
   h. Authorizing the first customer to provide each of said digital referral key codes to an individual recruited customer and authorizing the first customer to collect from each recruited customer, and retain, a predetermined resale program fee without any obligation to pay to the referral marketing program operator said resale program fee that the first customer collects from the recruited customer;
   i. For each said recruited customer, providing electronic access to said merchant online sales server, electronically receiving an online order placed by said recruited customer, and receiving payment for said order;
   j. Electronically inviting each said recruited customer to establish a referral marketing account associated with said recruited customer, and creating a referral block record within said recruited customer referral marketing account defining a numeric referral goal to be met by the recruited customer, said goal constituting an integer number of customers that the recruited customer is to refer to the merchant to earn a specified incentive;
   k. Automatically calculating a referral program fee due from the recruited customer to the referral marketing program operator, the amount of said referral program fee based at least in part on the numeric referral goal and varying based on the amount of the recruited customer's online order, and crediting said authorized resale program fee previously paid by the recruited customer to the first customer toward the calculated referral program fee due from the recruited customer to the referral marketing program operator.

2. The method of claim 1 wherein the authorized resale program fee collected by said first customer from each recruited customer is equal to the referral program fee paid by the first customer.

3. The method of claim 1 comprising the further step of electronically delivering a downloadable application to said first customer computing device and to computing devices of at least one recruited customer to communicate with the referral marketing transaction server via said one or more data transmission networks.

4. The method of claim 1 comprising the further step of offering said first customer a choice of recruiting goals within a predetermined range to define the recruiting goal applicable to the first customer's referral block record.

5. The method of claim 1 wherein said purchase selection in step (c) is received by the merchant online sales server and notice of the order, and identification of the first customer, is thereafter transmitted by the merchant online sales server to the referral marketing transaction server.

6. The method of claim 1 wherein said purchase selection in step (c) is received by the referral marketing transaction server and thereafter transmitted to the merchant online sales server for fulfilment.

7. The method of claim 1 wherein the first customer directly collects the authorized resale program fee from each recruited customer who receives a digital referral key code from said first customer.

8. The method of claim 7 wherein the total of the authorized resale program fees for said first customer's recruiting goal equals a predetermined multiple of the sum of (i) the referral program fee and (ii) the order price.

9. The method of claim 8 wherein said multiple is two.

10. The method of claim 8 wherein said first customer selects said multiple from a predetermined range.

11. The method of claim 10 wherein the referral program fee for creation of a referral block varies based on (i) the numeric referral goal, (ii) the order price, and (iii) said multiple.

12. The method of claim 1 wherein said merchant is an online marketplace offering products from a plurality of companies, whereby said customer orders are not limited to products distributed by a particular company.

13. The method of claim 1 comprising the further step of electronically transmitting a contract offer to each customer joining the referral program, authorizing the customer to provide said digital referral key codes to individual recruited customers and to collect from each recruited customer, and retain, a predetermined resale program fee, and electronically receiving signals confirming each customer's acceptance of said contract offer prior to delivering said referral key codes.

14. A method of processing referral marketing transactions for an online merchant, comprising the steps of:
  a. Providing a computerized referral marketing transaction server, said referral marketing transaction server connected via one or more data transmission networks to a customer computing device used by a customer;
  b. Electronically delivering a downloadable application to said customer computing device to communicate with the referral marketing transaction server via said one or more data transmission networks;
  c. Establishing a computer network connection between said referral marketing transaction server and an online sales server configured to receive and process customer orders for the merchant;
  d. Electronically receiving at said merchant online sales server an order placed by said customer using said customer computing device, and receiving payment of an associated order price;
  e. Creating in said referral marketing transaction server a referral record associated with a referral marketing account of said customer, said referral record defining a numeric referral goal to be met by the customer, said goal constituting an integer number of customers that the customer will refer to the merchant to earn a specified incentive;
  f. Automatically calculating a referral program fee due from the first customer to a referral marketing program operator, said referral marketing program operator being one of the merchant and an independent operator of the referral marketing transaction server, wherein the amount of said referral program fee is based at least in part on the numeric referral goal and varies based on the order price;
  g. Electronically transmitting a contract offer to said customer authorizing said first customer to provide each of said digital referral key codes to an individual recruited customer and to collect and retain from each recruited customer, a predetermined resale program fee, without any obligation to pay to the referral marketing program operator the resale program fee that the first customer collects from his recruited customers, and electronically receiving from said first customer signals confirming acceptance of said contract offer and a payment or other credit equal to said calculated referral program fee payable by the first customer to the referral marketing program operator;
  h. Activating said customer referral record, and providing to said customer a quantity of digital referral key codes equal to said numeric referral goal;
  i. For each said recruited customer, providing electronic access to said merchant online sales server, electronically receiving an online order placed by said recruited customer, and receiving payment for said order;
  j. Electronically inviting each said recruited customer to establish a referral marketing account associated with said recruited customer, and creating a referral record within said recruited customer referral marketing account defining a numeric referral goal to be met by the recruited customer, said goal constituting an integer number of customers that the recruited customer is to refer to the merchant to earn a specified incentive; and
  k. Automatically calculating a referral program fee due from the recruited customer to the referral marketing program operator, the amount of said referral program fee based at least in part on the numeric referral goal and varying based on the amount of the recruited customer's online order, and crediting said authorized resale program fee that was previously paid by the recruited customer to the first customer toward the calculated referral program fee due from the recruited customer to the referral marketing program operator.

15. The method of claim 14 wherein the customer directly collects the authorized resale program fee from each recruited customer who receives a digital referral key code from said customer.

16. The method of claim 15 wherein the total of the authorized resale program fees for said customer's recruiting goal equals a predetermined multiple of the sum of (i) the referral program fee and (ii) the order price.

17. The method of claim 16 wherein said multiple is two.

18. The method of claim 16 wherein said customer selects said multiple from a predetermined range.

19. The method of claim 18 wherein the referral program fee for creation of a referral block varies based on (i) the numeric referral goal, (ii) the order price, and (iii) said multiple.

20. The method of claim 14 wherein said merchant is an online marketplace offering products from a plurality of companies, whereby said customer orders are not limited to products distributed by a particular company.

* * * * *